(12) United States Patent
Kadoda et al.

(10) Patent No.: US 11,625,200 B2
(45) Date of Patent: Apr. 11, 2023

(54) INFORMATION PROCESSING DEVICE, MOBILE TERMINAL, AND NON-TRANSITORY COMPUTER READABLE MEDIUM FOR PARAMETER PRESENTATION

(71) Applicant: FUJIFILM Business Innovation Corp., Tokyo (JP)

(72) Inventors: Akira Kadoda, Kanagawa (JP); Tetsuya Kobayashi, Kanagawa (JP); Shun Mitsui, Kanagawa (JP); Tomohiko Ninomiya, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 516 days.

(21) Appl. No.: 16/558,161

(22) Filed: Sep. 2, 2019

(65) Prior Publication Data
US 2020/0301622 A1 Sep. 24, 2020

(30) Foreign Application Priority Data
Mar. 22, 2019 (JP) .............................. JP2019-055200

(51) Int. Cl.
*G06F 15/00* (2006.01)
*G06F 3/12* (2006.01)
*G06K 1/00* (2006.01)
*H04N 1/00* (2006.01)
*G02B 27/01* (2006.01)

(52) U.S. Cl.
CPC ....... *G06F 3/1204* (2013.01); *G02B 27/0172* (2013.01); *G06F 3/1257* (2013.01); *G06F 3/1292* (2013.01); *H04N 1/00403* (2013.01); *G02B 2027/014* (2013.01); *G02B 2027/0138* (2013.01)

(58) Field of Classification Search
CPC .... G06F 3/1204; G06F 3/1257; G06F 3/1292; H04N 1/00403
USPC ................................ 358/1.15, 1.14, 1.13, 1.1
See application file for complete search history.

(56) References Cited

U.S. PATENT DOCUMENTS

| | | | |
|---|---|---|---|
| 8,958,102 | B2 | 2/2015 | Maruyama |
| 10,025,382 | B2 | 7/2018 | Oyama |
| 10,908,777 | B2 | 2/2021 | Owari |
| 11,122,182 | B2 * | 9/2021 | Natori ................ H04N 1/00973 |

(Continued)

FOREIGN PATENT DOCUMENTS

| | | |
|---|---|---|
| JP | 2002351653 | 12/2002 |
| JP | 2014142873 | 8/2014 |

(Continued)

OTHER PUBLICATIONS

Office Action of Japan Counterpart Application, with English translation thereof, dated Dec. 27, 2022, pp. 1-6.

*Primary Examiner* — Douglas Q Tran
(74) *Attorney, Agent, or Firm* — JCIPRNET

(57) ABSTRACT

An information processing device includes an extraction unit and a confirmation unit. The extraction unit extracts a parameter different from an initial setting from among information about a combination of parameters related to a formation of an image, the information being saved in an image forming device to be operated. The confirmation unit presents the extracted parameter to a user, and prompts the user to confirm a desire to change.

15 Claims, 34 Drawing Sheets

(56) References Cited

U.S. PATENT DOCUMENTS

| | | | |
|---|---|---|---|
| 2009/0168103 A1* | 7/2009 | Yamada | G06F 3/1208 358/1.15 |
| 2013/0050731 A1* | 2/2013 | Fukuoh | H04N 1/00474 358/1.15 |
| 2015/0036185 A1* | 2/2015 | Asai | H04N 1/00413 358/1.15 |
| 2016/0065766 A1* | 3/2016 | Miyamoto | H04N 1/00517 358/1.13 |
| 2020/0125305 A1* | 4/2020 | Mihira | G06F 3/1253 |

FOREIGN PATENT DOCUMENTS

| | | |
|---|---|---|
| JP | 2014149680 | 8/2014 |
| JP | 2016206617 | 12/2016 |
| JP | 2018-046416 | 3/2018 |
| JP | 2018157241 | 10/2018 |
| JP | 2018207188 | 12/2018 |

* cited by examiner

FIG. 7

| TYPE OF DOCUMENT | PARAMETER NAME CANDIDATES |
|---|---|
| TEXT | TYPE OF DOCUMENT<br>DENSITY |
| PHOTOGRAPH | TYPE OF DOCUMENT<br>SATURATION OR SHARPNESS |
| MAP | TYPE OF DOCUMENT<br>DENSITY |
| FORM | BLEED-THROUGH PREVENTION<br>DENSITY |
| BOOKLET | CENTER REMOVAL<br>FRAME REMOVAL |

FIG. 8
— 232 IMPROPER PATTERNS OF COPY OUTPUT
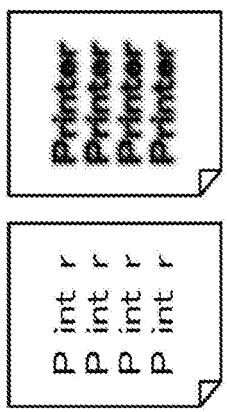
— 233 COPY MISALIGNMENT PATTERNS
— 234 FAINT PATTERNS
— 235 XXXX PATTERNS
— 236 RECORD OF PAST BLEMISHES
— 231 TYPICAL PATTERNS OF DIRTY COPYING
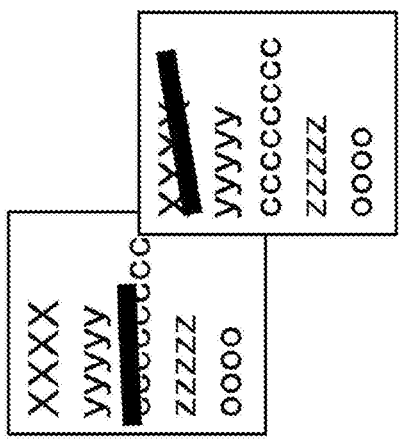
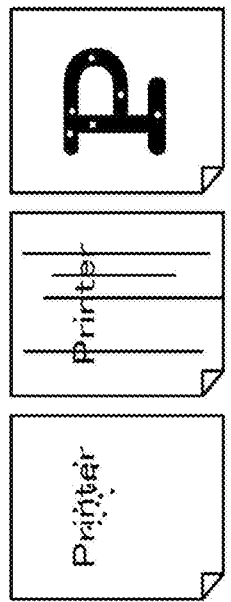
COPY DIRTY WITH LINES, STREAKS, OR DOTS
EXAMPLES OF BLEMISHES

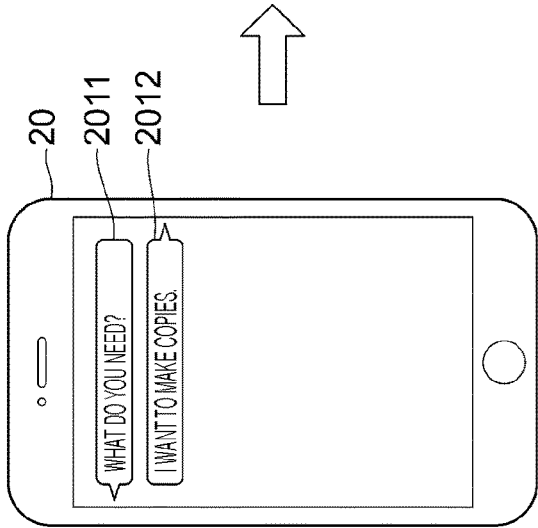
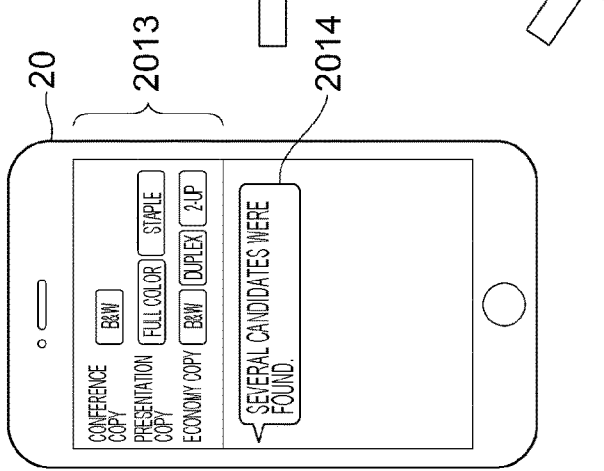
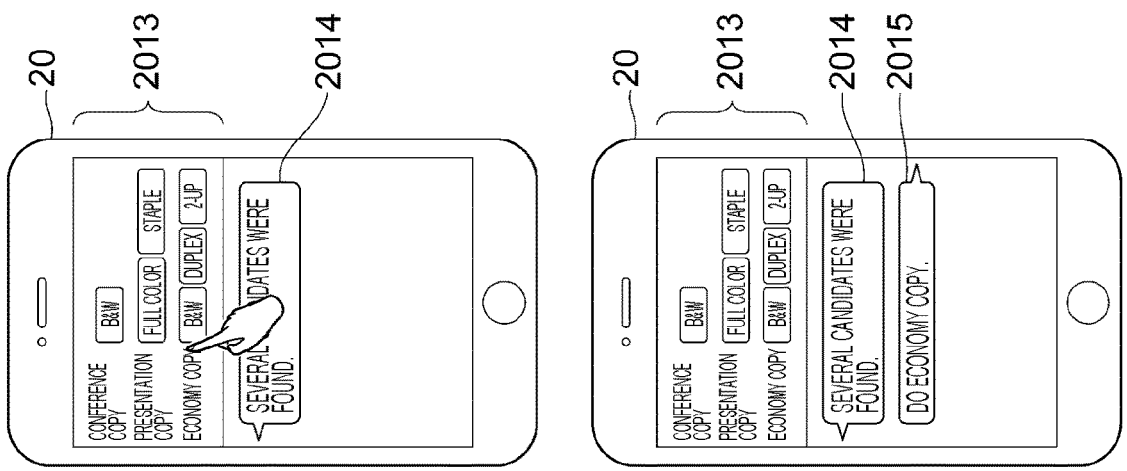
FIG. 13

FIG. 24
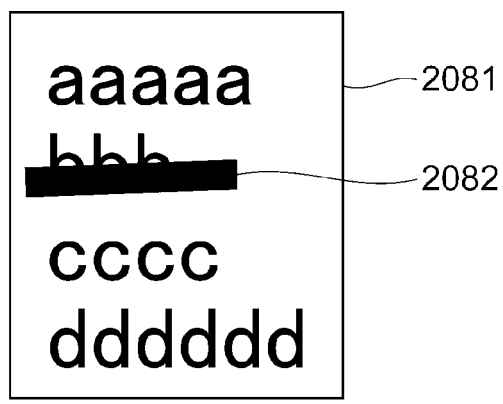
ANALYSIS RESULT: BLACK LINES
PREDICTED CAUSE: DIRTY GLASS PLATEN
TIME T12
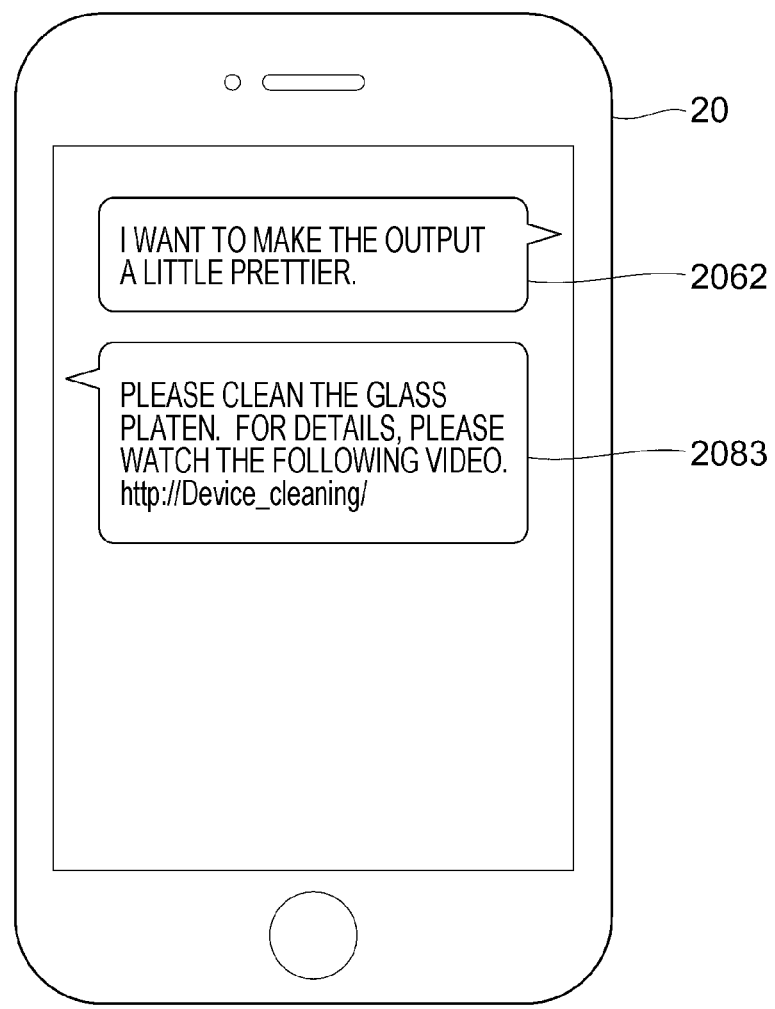

FIG. 25
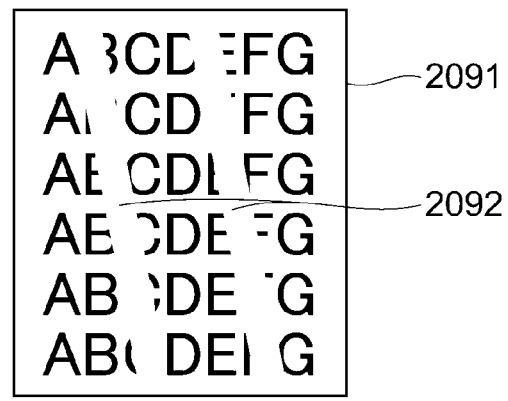
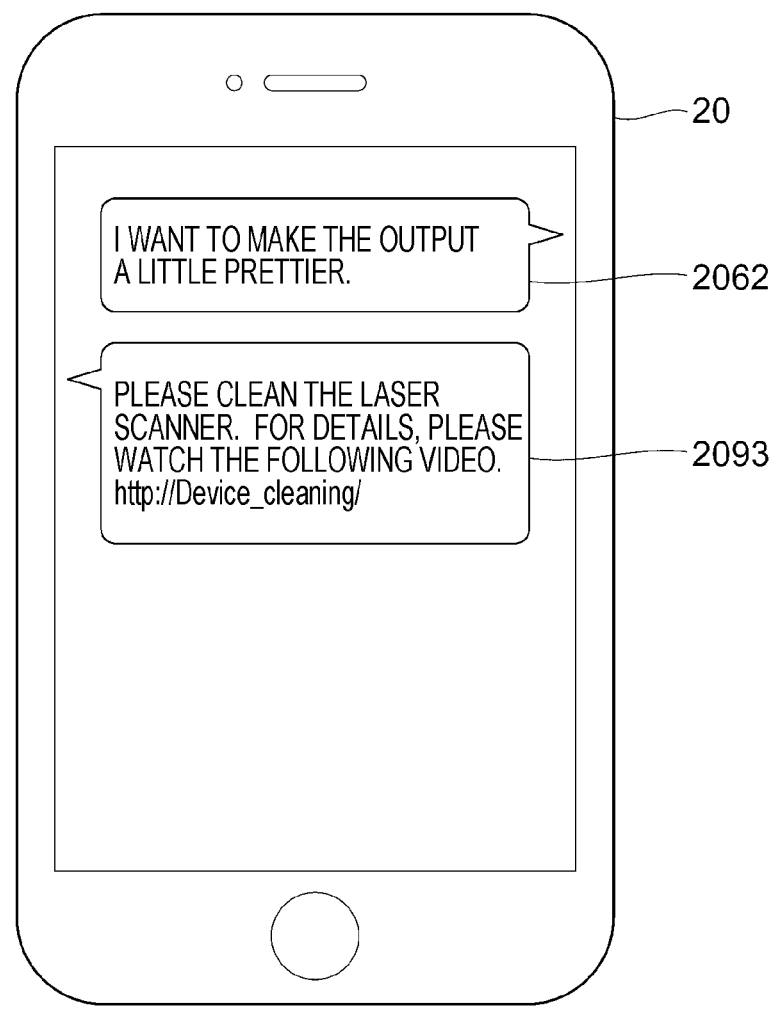

FIG. 32
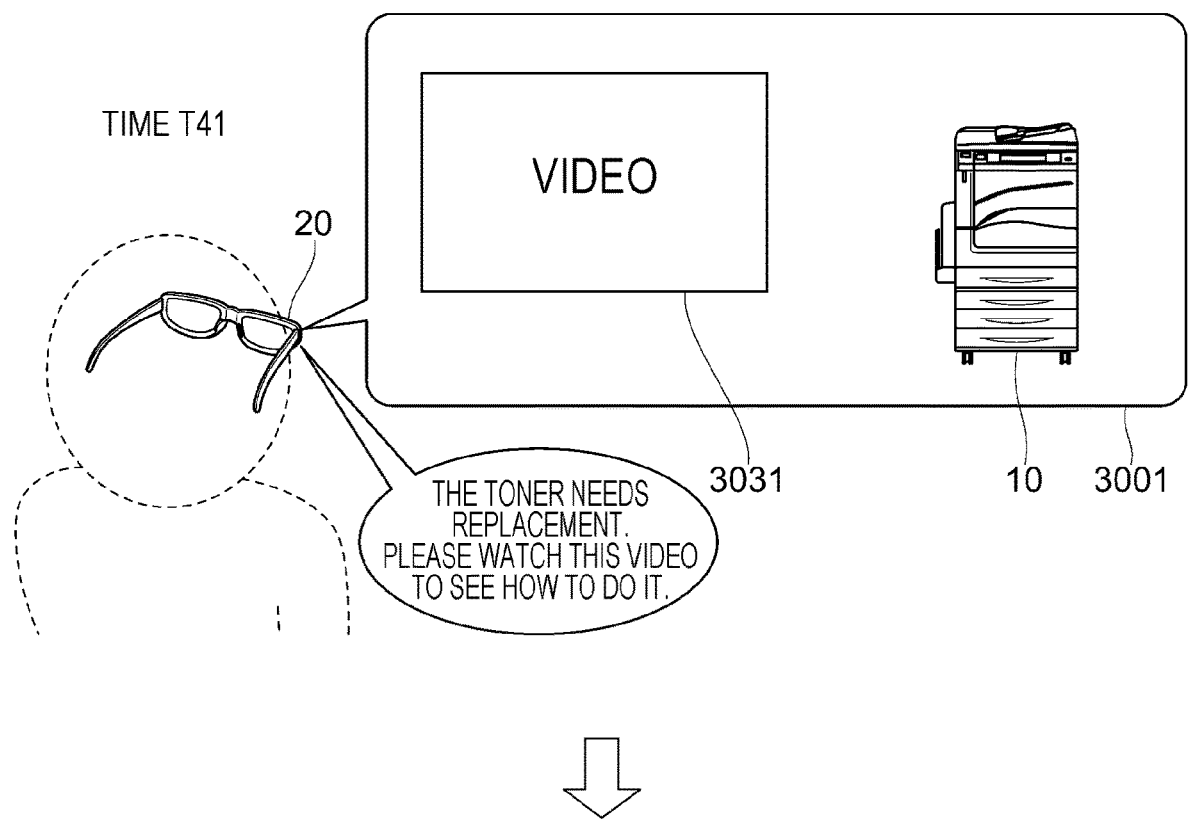
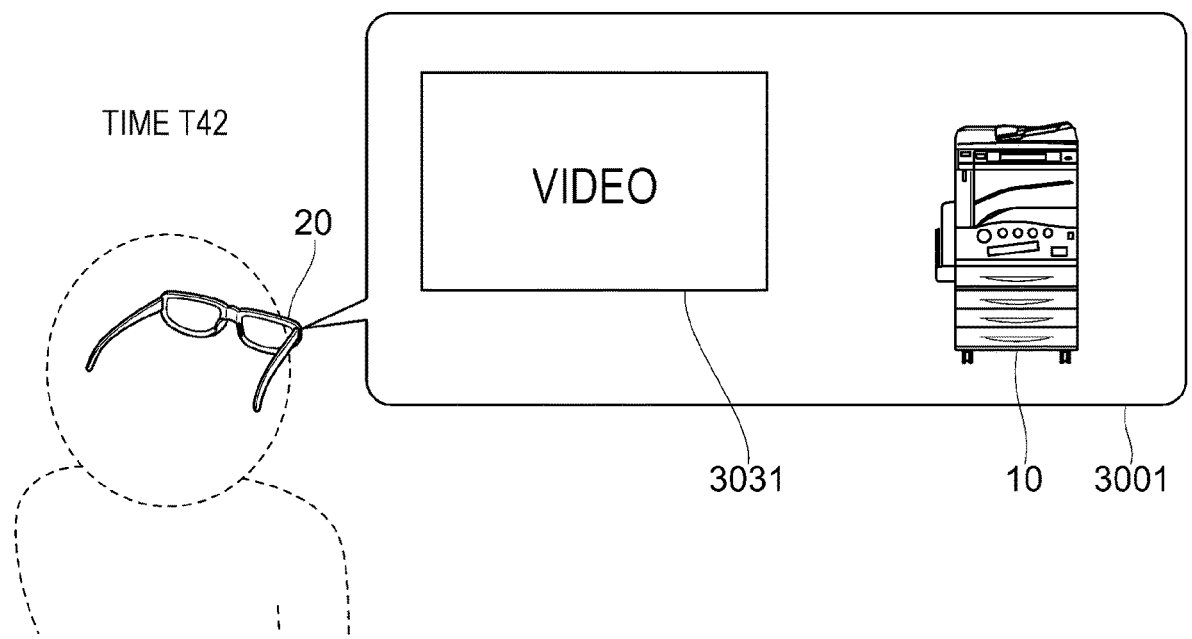

INFORMATION PROCESSING DEVICE, MOBILE TERMINAL, AND NON-TRANSITORY COMPUTER READABLE MEDIUM FOR PARAMETER PRESENTATION

CROSS-REFERENCE TO RELATED APPLICATIONS

This application is based on and claims priority under 35 USC 119 from Japanese Patent Application No. 2019-055200 filed Mar. 22, 2019.

BACKGROUND

(i) Technical Field

The present disclosure relates to an information processing device, a mobile terminal, and a non-transitory computer readable medium.

(ii) Related Art

As a function assisting the user, for example, image forming devices are provided with a function that saves repeatedly used operations and parameter values as a job memory. Settings saved as a job memory may be read out with the push of a button. Also, information such as a hierarchy of screens displayed over the course of a series of operations may also be stored in the job memory (for example, see Japanese Unexamined Patent Application Publication No. 2018-46416).

SUMMARY

If even one parameter is different, it may be necessary to save the settings as a separate job memory. For this reason, as the number of job memories increases, ease of use is decreased for the user. Also, because it is unrealistic to include all of the parameters in the save name, it may be difficult to grasp the content of the parameters from just the save name. For this reason, it may not be possible to check the content of the settings until after one has selected a job memory. In the case in which the job memory of the selected save name is different from what the user intended, the user may be required to select another job memory. At this point, ease of use is already reduced.

Aspects of non-limiting embodiments of the present disclosure relate to making it possible to create combinations of parameters intended by the user efficiently compared to a case in which the user has to check read-out combinations of parameters one at a time.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including an extraction unit and a confirmation unit. The extraction unit extracts a parameter different from an initial setting from among information about a combination of parameters related to a formation of an image, the information being saved in an image forming device to be operated. The confirmation unit presents the extracted parameter to a user, and prompts the user to confirm a desire to change.

BRIEF DESCRIPTION OF THE DRAWINGS

Exemplary embodiments of the present disclosure will be described in detail based on the following figure, wherein:

FIG. 7 is a diagram illustrating an example of a table storing a relationship between types of documents and parameter name candidates;

FIG. 8 is a diagram explaining an example of inexpedience patterns used by a prediction unit;

FIG. 13 is a diagram explaining an example of operating screen transitions in a case of finding multiple job memory candidates from the content of an utterance by the user;

FIG. 24 is a diagram explaining an example of an operating screen in a case where cleaning or the like of the image forming device is presented as a proposed troubleshooting measure by analysis of the cause of inexpedient output;

FIG. 25 is a diagram explaining another example of an operating screen in a case where cleaning or the like of the image forming device is presented as a proposed troubleshooting measure by analysis of the cause of inexpedient output;

FIG. 32 is a diagram explaining a guidance technique in a case where a troubleshooting measure such as cleaning is relevant to addressing the cause of the inexpedience;

DETAILED DESCRIPTION

Hereinafter, exemplary embodiments of the disclosure will be described with reference to the drawings.

Exemplary Embodiment 1

<System Configuration>

Figure 1:
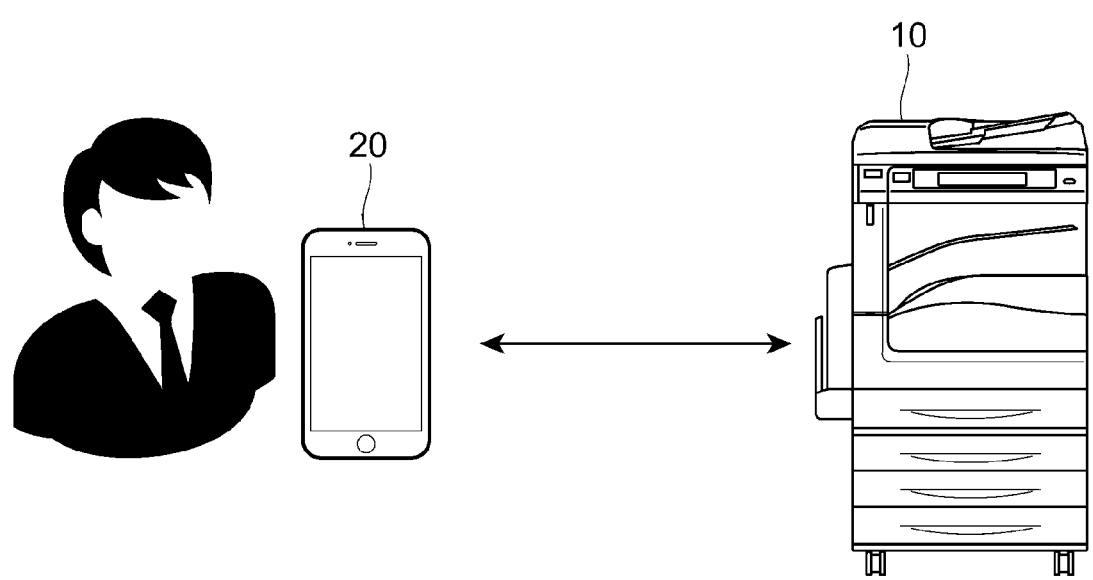
FIG. 1 is a diagram explaining one example of a system configuration anticipated by Exemplary Embodiment 1.

FIG. 1 is a diagram explaining one example of a system configuration anticipated by Exemplary Embodiment 1. The system anticipated by Exemplary Embodiment 1 includes an image forming device 10 that forms an image on a medium such as paper, and a terminal device 20 carried by a user who operates the image forming device 10.

In the case of the present exemplary embodiment, the user basically operates the terminal device 20. In other words, the user does not operate the image forming device 10 directly except for a Start button. The user operates the terminal device 20 to instruct the image forming device 10 to read out and execute a job memory.

A job memory is a record of parameter settings related to what is called a job, such as printing, scanning, or faxing. Job memories are distinguished by job memory names. By recording combinations of frequently-used parameter settings as a job memory, it becomes possible to read out the frequently-used parameter settings with the push of a button, and as a result, the setup work is simplified. Note that a job memory is one example of information about a combination of parameters related to the formation of an image.

A single job memory includes a job memory name, an operation name, parameter names, and parameter values. The operation name is the name of a function related to the job memory, such as copy, scan, or fax for example. The parameter names are a broad classification of parameter values. Copy-related parameter names include color mode, density, and paper size, for example. The parameter values are individual values set by the user. For example, color mode parameter values may include "Color" and "Black and White", density parameter values may include "Darker" and "Lighter", and paper size parameter values may include "A4" and "A3".

In the terminal device 20 according to the present exemplary embodiment, a function that assists with the specification of a job memory by the user is made available. The terminal device 20 referred to herein is one example of an information processing device.

The image forming device 10 and the terminal device 20 illustrated in FIG. 1 are connectible by short-range wireless communication. For the short-range wireless communication, Bluetooth (registered trademark), wireless local area network (LAN), or near field communication (NFC) is used, for example.

In wireless LAN, Wi-Fi Direct (registered trademark) is used for example. Wi-Fi Direct is a mode in which the image forming device 10 and the terminal device 20 communicate one-on-one as access points.

In NFC, among the multiple standards, ISO/IEC 14443 is used. Devices conforming to the same standard are capable of communicating when brought within approximately 10 cm of each other.

The terminal device 20 according to the present exemplary embodiment is a mobile terminal. Mobile terminals include smartphones, wearable terminals, and laptop computers, for example. FIG. 1 illustrates an example in which the terminal device 20 is a smartphone.

<Configuration of Each Device>

Hereinafter, device configurations of the image forming device 10 and the terminal device 20 will be described individually.

<Configuration of Image Forming Device>

Figure 2:
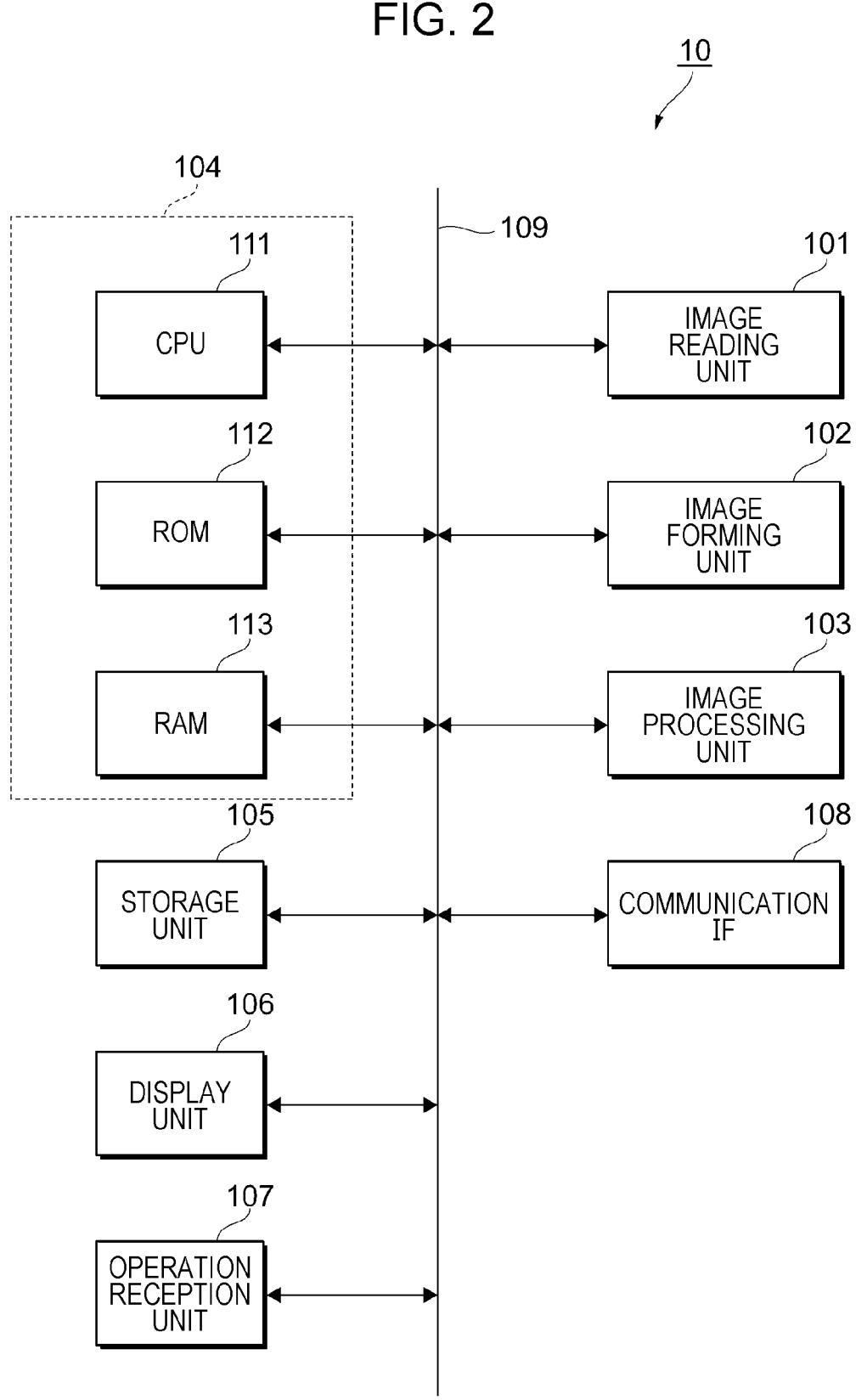
FIG. 2 is a diagram explaining an exemplary configuration of an image forming device used in Exemplary Embodiment 1.

FIG. 2 is a diagram explaining an exemplary configuration of the image forming device 10 used in Exemplary Embodiment 1.

The image forming device 10 includes an image reading unit 101 that reads an image of a document, an image forming unit 102 that forms an image on a medium such as paper, an image processing unit 103 that performs processing such as color correction and tone correction on an image expressed by image data, a control unit 104 that controls the operations of the device as a whole, a storage unit 105 that stores image data and the like, a display unit 106 used to display user interface screens and the like, an operation reception unit 107 that receives user operations, and a communication interface (IF) 108 that achieves short-range wireless communication and other types of communication.

The image reading unit 101 is also referred to as a scanner, and may include a function of automatically feeding documents.

The image forming unit 102 is a unit that forms an image on a medium by an electrophotographic system, an inkjet system, or the like, and includes functions according to the image formation method.

The image processing unit 103 includes a special-purpose processor, processing circuit, or the like for processing image data.

The control unit 104 includes a central processing unit (CPU) 111, read-only memory (ROM) 112 storing data such as firmware and a basic input-output system (BIOS), and random access memory (RAM) 113 that is used as a work area. The control unit 104 functions as a so-called computer. Note that the ROM 112 may also be non-volatile rewritable semiconductor memory.

Also, the storage unit 105 includes a non-volatile storage device such as a hard disk drive (HDD). The storage unit 105 saves data such as image data read by the image reading unit 101, image data supplied externally by communication, image data received via fax transmission, a list of job memory names (hereinafter referred to as the "job memory name list"), a parameter list for each job memory, a list of default parameters (hereinafter referred to as the "default parameter list"), and a history of job memories read out by the terminal device 20.

Also, the display unit 106 includes a liquid crystal display or an organic electroluminescence (EL) display, for example.

The communication IF 108 includes an interface circuit corresponding to a communication standard such as Bluetooth, wireless LAN, and NFC described earlier.

The operation reception unit 107 includes a touch sensor, switches, buttons, and the like arranged on the surface of the display unit 106.

Incidentally, the control unit 104 is connected to each of the other units and the like via a bus 109 and signal lines not illustrated.

Figure 3:
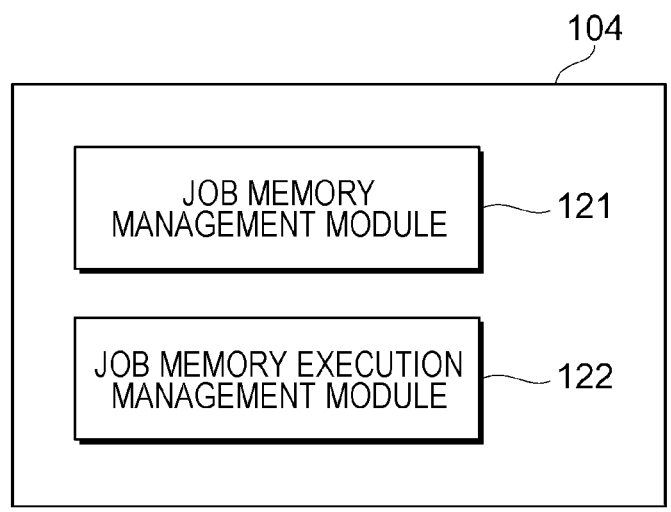
FIG. 3 is a diagram explaining an exemplary functional configuration of a control unit used in Exemplary Embodiment 1.

FIG. 3 is a diagram explaining an exemplary functional configuration of the control unit 104 used in Exemplary Embodiment 1. The function modules illustrated in FIG. 3 are realized by the CPU 111 (see FIG. 2) executing a program. Note that the function modules illustrated in FIG. 3 are one example of function modules provided by the control unit 104.

The control unit 104 according to the present exemplary embodiment includes the functions of a job memory management module 121 that manages information related to job memories (hereinafter also referred to as "job memory information") and a job memory execution management module 122 that manages the execution of job memories.

The job memory management module 121 executes functions such as saving, reading out, and receiving changes to job memories, managing a history, and managing the job memory name list.

In a case in which the job memory name list is requested by the terminal device 20 (see FIG. 1) operated by a user whose rights have been recognized by user authentication, the job memory management module 121 according to the present exemplary embodiment transmits the job memory name list to the terminal device 20.

In addition, the job memory management module 121 is also provided with a function of transmitting, to the terminal device 20, the parameter list of a specific job memory designated for read-out from the terminal device 20 side and a corresponding default parameter list.

In the case of the present exemplary embodiment, the parameter list is a list of operation names, parameter names, and parameter values managed in association with a job memory name. Consequently, a single job memory includes a job memory name and a parameter list.

Also, in the case of the present exemplary embodiment, the default parameter list refers to a parameter list prepared by the manufacturer of the image forming device 10 or set by the administrator of the image forming device 10.

The job memory execution management module 122 defers the execution of a read-out job memory for a period until a predetermined amount of time elapses from the point in time of receiving the request for the read-out of a specific job memory from the terminal device 20. In the present exemplary embodiment, the time of deferred execution is utilized as a period for receiving changes to the parameter list (hereinafter referred to as the "change reception period").

The length of the change reception period is user-adjustable. Of course, in cases where change is unnecessary, an instruction setting the change reception period to zero may also be input from the terminal device 20.

<Configuration of Terminal Device>

Figure 4:
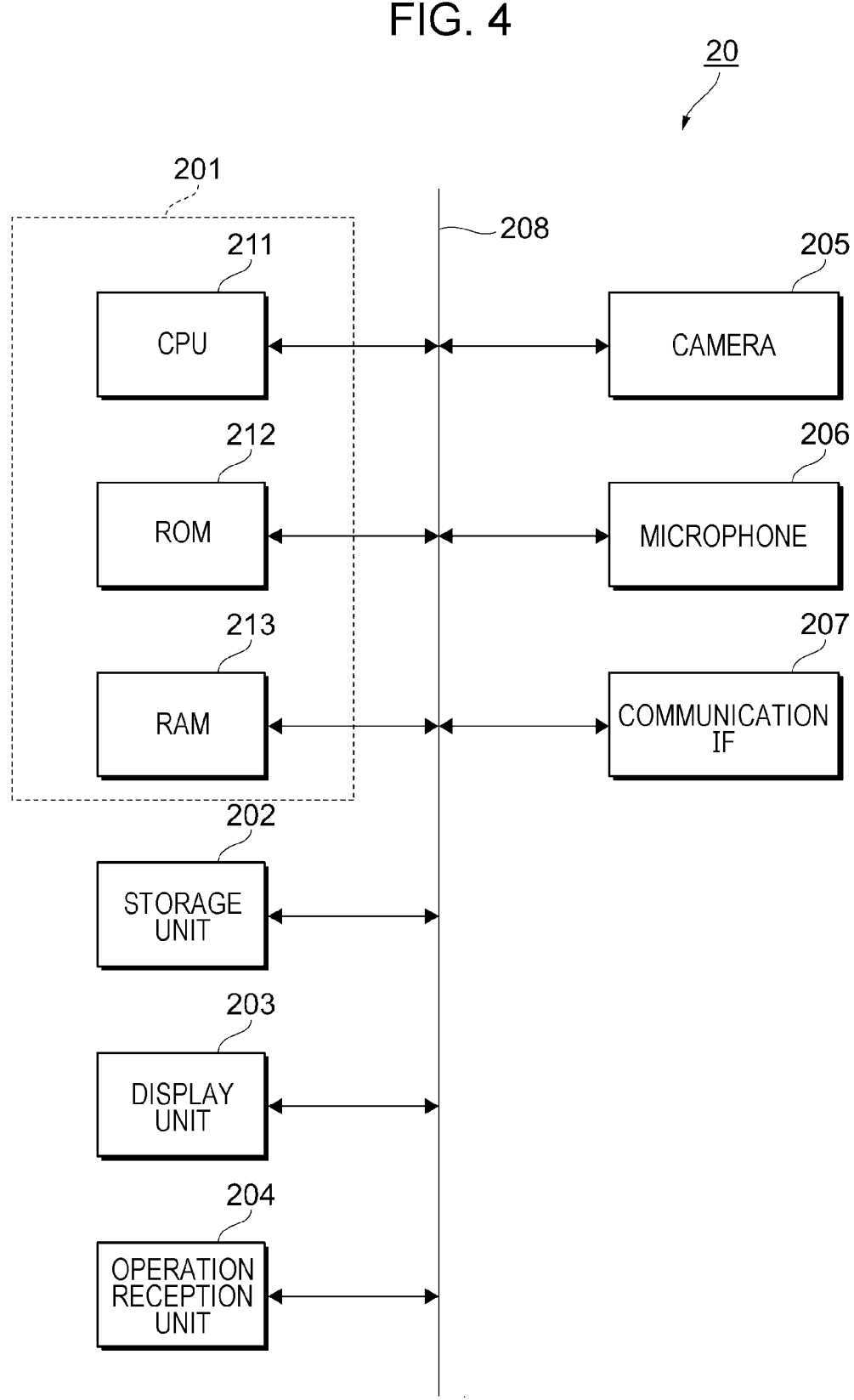
FIG. 4 is a diagram illustrating an exemplary configuration of a terminal device used in Exemplary Embodiment 1.

FIG. 4 is a diagram illustrating an exemplary configuration of the terminal device 20 used in Exemplary Embodiment 1.

The terminal device 20 illustrated in FIG. 4 includes a control unit 201 that controls the operations of the device as a whole, a storage unit 202 that stores image data and the like, a display unit 203 used to display user interface screens and the like, an operation reception unit 204 that receives user operations, a camera 205 that captures images, a microphone 206 that converts user speech into an electric signal, and a communication interface (IF) 207.

The control unit 201 according to the present exemplary embodiment includes a CPU 211, ROM 212 storing data such as firmware and a BIOS, and RAM 213 that is used as a work area. The control unit 201 functions as a so-called computer. Note that the ROM 212 may also be non-volatile rewritable semiconductor memory.

The storage unit 202 includes non-volatile rewritable semiconductor memory or the like. The storage unit 202 saves image data captured by the camera 205, speech data recorded by the microphone 206, a job memory name list read out from the image forming device 10, a job memory history read out from the image forming device 10, and an application program that assists with setting parameters with respect to the image forming device 10, for example.

The display unit 203 includes a liquid crystal display or an organic EL display for example. Information that assists operations by the user is displayed on the display unit 203.

The operation reception unit 204 includes a touch sensor, switches, buttons, and the like arranged on the surface of the display unit 203.

Incidentally, the control unit 201 is connected to each of the other units and the like via a bus 208 and signal lines not illustrated.

The camera 205 according to the present exemplary embodiment is capable of capturing still images or moving images.

The microphone 206 converts speech uttered by the user into an electric signal. The microphone 206 enables speech-based user operations. Of course, this does not preclude the reception of operations by the operation reception unit 204.

Figure 5:
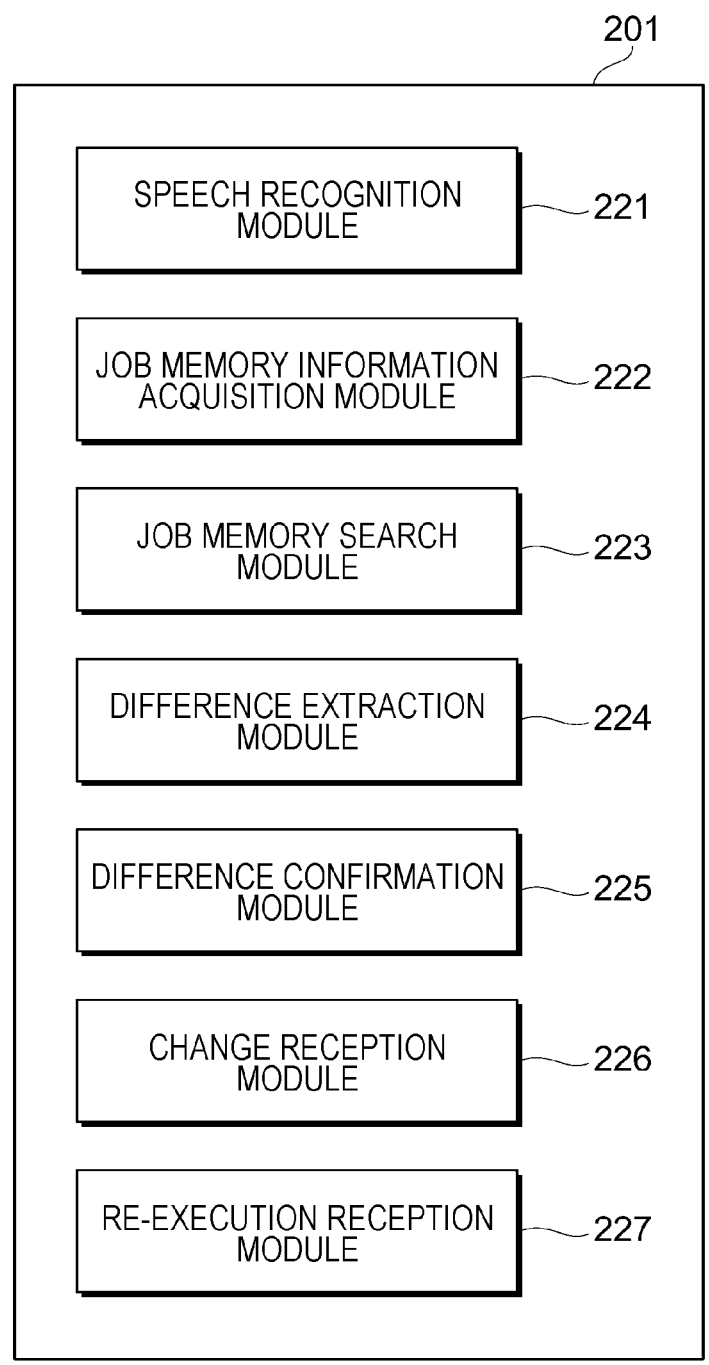
FIG. 5 is a diagram explaining an exemplary functional configuration realized by the control unit of the terminal device.

FIG. 5 is a diagram explaining an exemplary functional configuration realized by the control unit 201 of the terminal device 20. The function modules illustrated in FIG. 5 are realized by the CPU 211 (see FIG. 4) executing a program. The program here is an application program that assists with setting parameters with respect to the image forming device 10. Note that the function modules illustrated in FIG. 5 are one example of function modules provided by the control unit 201.

The control unit 201 according to the present exemplary embodiment functions as a speech recognition module 221 that recognizes user speech, a job memory information acquisition module 222 that acquires job memory information from the image forming device 10 (see FIG. 1) to be operated, a job memory search module 223 that searches for a job memory on the basis of content uttered by the user, a difference extraction module 224 that extracts differences between parameter values saved in the job memory and corresponding default values, a difference confirmation module 225 that presents the extracted differences to the user and prompts the user for confirmation, a change reception module 226 that receives changes to parameter values, and a re-execution reception module 227 that receives a re-execution of a job memory that has been executed in the past.

The speech recognition module 221 is a program that converts user speech into a character string. The speech recognition module 221 includes for example a feature extraction unit that extracts speech features, and a recognition engine that generates a character string from feature quantities such as mel-frequency cepstrum coefficients. Since speech recognition technology is already in practical use, a detailed description is omitted.

In the present exemplary embodiment, the process of speech recognition is completed by the speech recognition module 221, but a cloud service or the like may also be utilized to acquire a speech recognition result.

Note that the user is also able to select an input that does not use the speech recognition module 221. The input that does not use the speech recognition module 221 refers to tapping a button or similar element displayed on an operating screen.

The job memory information acquisition module 222 acquires job memory information from the image forming device 10 to be operated. In the case of the present exemplary embodiment, the job memory information includes a job memory and a default parameter list.

In the case of the present exemplary embodiment, the job memory information acquisition module 222 requests the job memory information from the image forming device 10 at the point in time when communication with the image forming device 10 to be operated is established. Note that in the case in which multiple image forming devices 10 capable of communication exist, a single image forming device 10 selected by the user is set as the device to communicate with. The image forming device 10 to communicate with is selected from a list of device names, for example.

The job memory search module 223 treats the job memories among the job memory information acquired from the image forming device 10 as the target of a search. The job memory search module 223 uses a word or words included in an utterance by the user as a search key, and searches for job memory candidates that the user desires. For example, in the case where the user says "Copy please", the job memory search module 223 searches for a job memory containing "copy" in the job memory name or the parameter list.

Note that the common names the user uses to refer to parameter names and parameter values in an utterance may be different from the default common names for the parameter names and parameter values used in the image forming device 10 to communicate with. For example, parameter names and parameter values may be referred to by different common names depending on the manufacturer. For example, the parameter name corresponding to a function of changing the scale of multiple documents to fit on a single sheet of paper is called "Pages Per Sheet" by one manufacturer, and the parameter values are called "2-Up", "4-Up", and so on.

For this reason, the job memory search module 223 according to the present exemplary embodiment is provided with a table that associates the designations of parameter names and parameter values included in utterances with common names from other manufacturers. The job memory search module 223 uses this table to search for a job memory that is close to the user's intention. Note that in the case in which common names included in a user utterance do not exist in the table, it is desirable to save the parameter name and parameter value ultimately specified by the user in associated with the common names uttered by the user.

Incidentally, a table that records correspondence relationships between common names may also be prepared as a trained model obtained by using machine learning on the correspondence relationships between common names.

When a common name extracted from a user utterance is input, the trained model outputs one or multiple common names related to the input common name.

It is desirable to supply the trained model with existing common names ultimately associated with unknown common names as teaching data, and continually update the correspondence relationships.

The updating of the trained model may be executed on the terminal device 20 (see FIG. 1) as a trained model unique to the user, or may be executed on a cloud server (not illustrated) that aggregates the operation histories of unspecified users. The table and the trained model here are also used by the change reception module 226.

The job memory search module 223 according to the present exemplary embodiment presents search results in a list format, for example. In this case, the job memory search module 223 displays saved parameter values in association with the job memory name.

Additionally, the job memory search module 223 according to the present exemplary embodiment also includes a function of also displaying an unsaved job memory that has a high likelihood of being used by the user as a search result, in cooperation with the change reception module 226. This function is achieved by referencing a change history accumulated in the terminal device 20. For example, in the case in which the user often uses a saved job memory by partially changing the content of the saved job memory, the unsaved changed content is also displayed on the screen as one of the candidates.

The difference extraction module 224 extracts differences between the parameter list of a job memory specified as the target of read-out by the user and the default parameter list. In other words, from among the parameter values of the job memory specified as the target of read-out by the user, the content that has been changed from the default parameter values is extracted. If these differences are understood, it becomes easy for the user to understand the features of the job memory. The difference extraction module 224 is one example of an extraction unit.

In actuality, a job memory is defined as a set of many parameter values. The job memory name is given for the purpose of making it easier to understand the features.

However, in cases where many similar job memory names have been saved, it becomes difficult to understand the differences between job memories just from the job memory names. Also, even if a list of the parameter values are displayed on the screen, if there are many items to be displayed, it may be difficult to compare the parameter values of similar job memories, making it difficult to grasp the differences between job memories. Eventually, a case may occur in which the result of executing a job memory is different from what the user intended. Also, even in cases where the differences between job memories may be grasped before executing a job memory, it may take a long time to confirm the differences.

The difference confirmation module 225 presents the differences extracted by the difference extraction module 224 to the user, and seeks confirmation from the user. For example, parameters values that are different from the default parameter values from among the parameter values of the job memory specified by the user are selectively presented to the user.

For example, in the case in which the default parameter values are "Color" and "A4 Size", and the parameter values of the job memory specified by the user are "Black and White" and "A5 Size", the difference confirmation module 225 extracts "Black and White" and "A5 Size" as the difference information. In this case, the difference confirmation module 225 displays a message such as "Output set to A5 and black and white. If this is OK, please press the Start button on the device." is displayed on the screen.

The presented difference information plainly expressed the features of the job memory. For this reason, even in the case in which multiple job memories with similar job memory names exist, the differences from the user's intentions are confirmed efficiently. The difference confirmation module 225 is one example of a confirmation unit.

The change reception module 226 is responsible for a series of processes for receiving an instruction to change a parameter value from the user who has noticed a difference from one's own intentions, and for instructing the image forming device 10 to make the change. The change reception module 226 receives a change instruction in cooperation with the speech recognition module 221, for example. Consequently, the change reception module 226 is one example of a reception unit. As described earlier, the change reception module 226 also uses the table and the trained model used by the job memory search module 223.

The change reception module 226 in the present exemplary embodiment also includes a function of confirming whether or not the specified parameter value change is allowed. In the case in which the change is not allowed, there may be a parameter prohibited from being changed, for example. A parameter prohibited from being changed occurs in cases determined in relation to the job memory and in cases determined from the usage environment of the user.

Examples determined in relation to the job memory include changes that are contrary to the original intention of the job memory. Examples include the case of changing the operation name to "Scan" when the operation name of the job memory is "Copy", and the case of changing the parameter value to "4-Up" when the job memory name of the job memory is "2-Up Copy".

Examples determined from the usage environment of the user include changing the parameter value to "Color" when only black and white output is allowed from the perspective of economic efficiency.

The terminal device 20 may be notified of such prohibited matter when communication with the image forming device 10 is available, or the prohibited matter may be set in the terminal device 20 during installation as a part of the functions of the change reception module 226, and a notification of the prohibited matter may be issued in cooperation with a cloud service not illustrated.

Of course, even in cases associated with a change to such prohibited matter, when operating the image forming device 10, recording the change as a new job memory may be allowed.

The change reception module 226 according to the present exemplary embodiment additionally includes a function of confirming whether or not to receive the specified parameter value change, even in cases that are not applicable to the prohibited matter described above.

For example, the change reception module 226 rejects reception of the change instruction after a change reception period elapses. This is because execution of the job memory has already been started.

For example, the change reception module 226 rejects reception of the change instruction in the case where the specified parameter value change relates to a parameter value unrelated to the operation name of the corresponding job memory. For example, in the case in which the operation name of the job memory is "Email", changes indicating the addition of post-processing such as "Staple", "Hole-punch", and "Crease" are rejected.

For example, the change reception module 226 rejects a change to a parameter value that is not executable with the mechanisms of the image forming device 10 being communicated with. For example, in the case in which a post-processing device such as a staple unit is not attached to the image forming device 10, an instruction to change the parameter value to "Staple" is rejected.

Note that as a function of the job memory execution management module 122 (see FIG. 3) on the image forming device 10 side, a function of confirming that the terminal device 20 that has issued the instruction to execute the job memory is identical to the terminal device 20 that has issued the instruction to change a parameter value may also be provided. This function rejects parameter value changes from a terminal device 20 different from the terminal device 20 that issued the instruction to execute the job memory.

In addition, the change reception module 226 according to the present exemplary embodiment also includes a function of cooperating with a destination table saved in the image forming device 10. Herein, the destination table is saved in the storage unit 105 (see FIG. 2).

A job memory may include a destination as a parameter value in some cases. If the destination specified by the parameter value is different from the destination that the user is expecting, there is a possibility that an unforeseen hindrance may occur.

For this reason, the change reception module 226 according to the present exemplary embodiment is provided with a function of acquiring a destination table corresponding to the job memory from the image forming device 10 in the case where a destination is included as a parameter value.

File names of the destination table read out from the image forming device 10 are presented to the user in a list format, for example. When the user designates a specific file name, the change reception module 226 requests the image forming device 10 to change the file name to the designated file name.

Note that the change reception module 226 adds the result of a user operation related to the cooperation with the destination table to the operation history. For example, the job memory name and the changed file name of the destination table are saved in association with the user.

As described earlier, a history of each of the content of user utterances, job memory names selected by the user, and parameter value changes specified by the user are saved in the storage unit 202 (see FIG. 4) of the terminal device 20, and are used when reading out or changing a job memory the next time onward. Specifically, job memory candidates and change candidates are presented on the basis of the histories. Note that the content of the presented candidates is not limited to what is saved as job memories.

Also, in the case in which the user specifies a parameter value change, the change reception module 226 according to the present exemplary embodiment is provided with a function of confirming whether the user wants to save the changed combination of parameter values as a new job memory.

Note that in the case where saving as a new job memory is desired, it is possible to use the job memory name from before the change, but this will result in multiple job memories being saved with the same job memory name.

For this reason, the change reception module 226 according to the present exemplary embodiment uses a designation obtained by adding the parameter name or names whose to be changed according to the instruction to the parameter value of the job memory name from before the change as a default name for the new job memory. Note that the user is able to modify the default name.

The re-execution reception module 227 is executed in the case of determining, in cooperation with the speech recognition module 221, that the content of a user utterance expresses an intention to re-execute a job memory. In other words, the re-execution reception module 227 is executed in the case of determining that the content of a user utterance expresses an intention to again read out a job memory executed just before, a desire to read out and change one or more parameter values, or the like.

In the determination at this point, whether or not a redo of the job memory is being suggested is used as the intention of the context recognized as the content of the utterance. For example, cases in which the content of the utterance is "I want to run it one more time", "I want to make the output a little prettier", or "I want to redo the job in black and white" are understood as cases in which a redo a the job memory is being suggested. Incidentally, "I want to run it one more time" is understood to be a simple re-execution. On the other hand, "I want to make the output a little prettier" and "I want to redo the job in black and white" are understood to be a re-execution accompanied by a parameter value change or the like.

The re-execution reception module 227 presents the job memory executed just before to the user. This is because the job memory executed just before is the base of reference. Of course, if it is possible to specify the job memory to be re-executed, the present job memory is not limited to being the job memory executed just before.

In the case in which the content of the utterance contains an instruction related to a parameter, the re-execution reception module 227 presents candidates for changing a parameter value to achieve the user's desired output. Examples of the utterance at this point include "I want to make it a little darker". In this example, an instruction related to the "Density" parameter name is contained in the content of the utterance.

In the case of this example, the re-execution reception module 227 presents "Darker+1", "Lighter−1", or the like with regard to the density as recommended candidates for changing the parameter value.

In the case in which content related to the image quality of the processing result is contained in the content of the utterance, the re-execution reception module 227 presents narrowed-down parameter names recommended for changing, troubleshooting measures, or the like through voice interaction with the user, analysis of an image log, or a combination of the two, for example.

Examples of narrowing down parameter names recommended for changing through voice interaction with the user include the example of asking the question "What is the document?" when the user says "I want to make the output a little prettier." Herein, "prettier" is content related to image quality. The parameter values for achieving "prettier" output also differ depending on the type of document. Accordingly, voice interaction is used as one technique of narrowing down the parameter values that contribute to improved image quality.

The technique of analyzing the image log is used in cases where an image log of the output results of the image forming device 10 is obtainable and in cases where an image is acquirable by the camera 205 (see FIG. 4).

Figure 6:
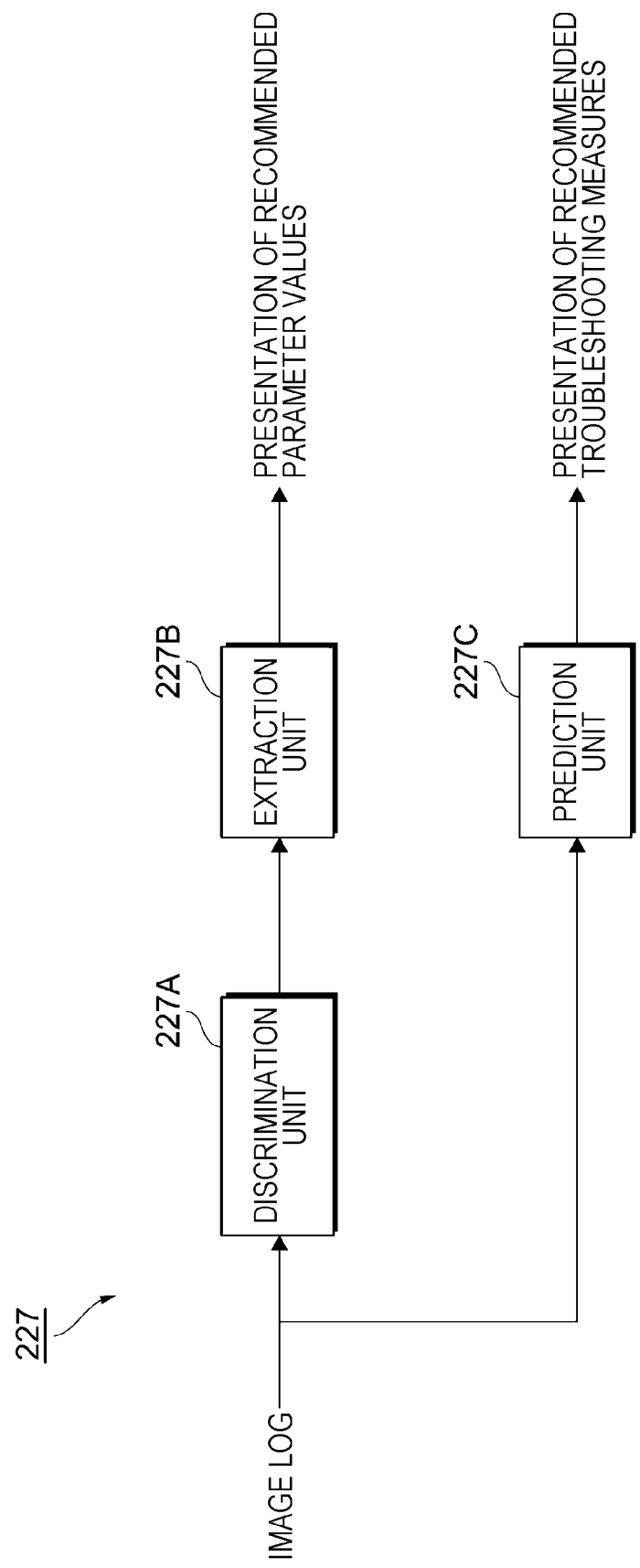
FIG. 6 is a diagram explaining one example of a functional configuration provided in a re-execution reception module.

FIG. 6 is a diagram explaining one example of a functional configuration provided in the re-execution reception module 227. The re-execution reception module 227 illustrated in FIG. 6 includes a discrimination unit 227A that discriminates the type of document by image log analysis, and an extraction unit 227B that extracts candidates of parameter names for which changing the parameter value is recommended.

The discrimination unit 227A discriminates the type of document on the basis of a characteristic pattern appearing in the image log. For example, the discrimination unit 227A compares the image log to pattern images prepared for each type, and calculates the agreement with each pattern image. In the present exemplary embodiment, text, photograph, map, form, and booklet are anticipated as types of documents. The discrimination unit 227A specifies the type of document on the basis of the pattern image having the highest agreement. If the type of document is specified, it becomes possible to narrow down the parameter values that contribute to improved image quality similarly to the voice interaction method.

The extraction unit 227B extracts candidates of parameter names for which changing the parameter value is recommended, according to the type of document.

FIG. 7 is a diagram illustrating an example of a table storing a relationship between types of documents and parameter name candidates.

In the example illustrated in FIG. 7, the type of document and density are associated with the "Text" type of document. Also, the type of document and saturation or sharpness are associated with the "Photograph" type of document. Also, the type of document of the density are associated with the "Map" type of document. Also, bleed-through prevention and density are associated with the "Form" type of document. Also, center removal and frame removal are associated with the "Booklet" type of document.

In the case of the present exemplary embodiment, the extraction unit 227B is also provided with a function of deciding and presenting recommended parameter values for every extracted parameter name candidate. The recommended parameter values are decided according to the parameter values in the job memory executed just before, the content of the user utterance, the result of image analysis, and the like.

The description will now return to FIG. 6. As another function used in the analysis of the image log, the re-execution reception module 227 is provided with the function of a prediction unit 227C that predicts the cause of an inexpedience and presents recommended troubleshooting measures according to the prediction.

FIG. 8 is a diagram explaining an example of inexpedience patterns used by the prediction unit 227C. FIG. 8 illustrates examples of typical patterns of dirty copying 231, improper patterns of copy output 232, copy misalignment patterns 233, faint patterns 234, XXXX patterns 235 as an example of other patterns, and a record of past blemishes 236. Note that the image log recognized as an inexpedient pattern is saved as the record of past blemishes 236.

Herein, lines, streaks, and dots are given as examples of the typical patterns of dirty copying 231. Incidentally, in the case in which a blemish appears as black lines, a dirty glass platen is conceivable as the cause, and therefore the cleaning of the glass platen is presented as a troubleshooting measure. Also, in the case in which a blemish appears as white streaks, the cleaning of the laser scanner is presented as a troubleshooting measure.

<Processing Operations>

Hereinafter, processing operations by the image forming device 10 and the terminal device 20 will be described.

<Operations that Assist with Setting Desired Parameters>

Figure 9:
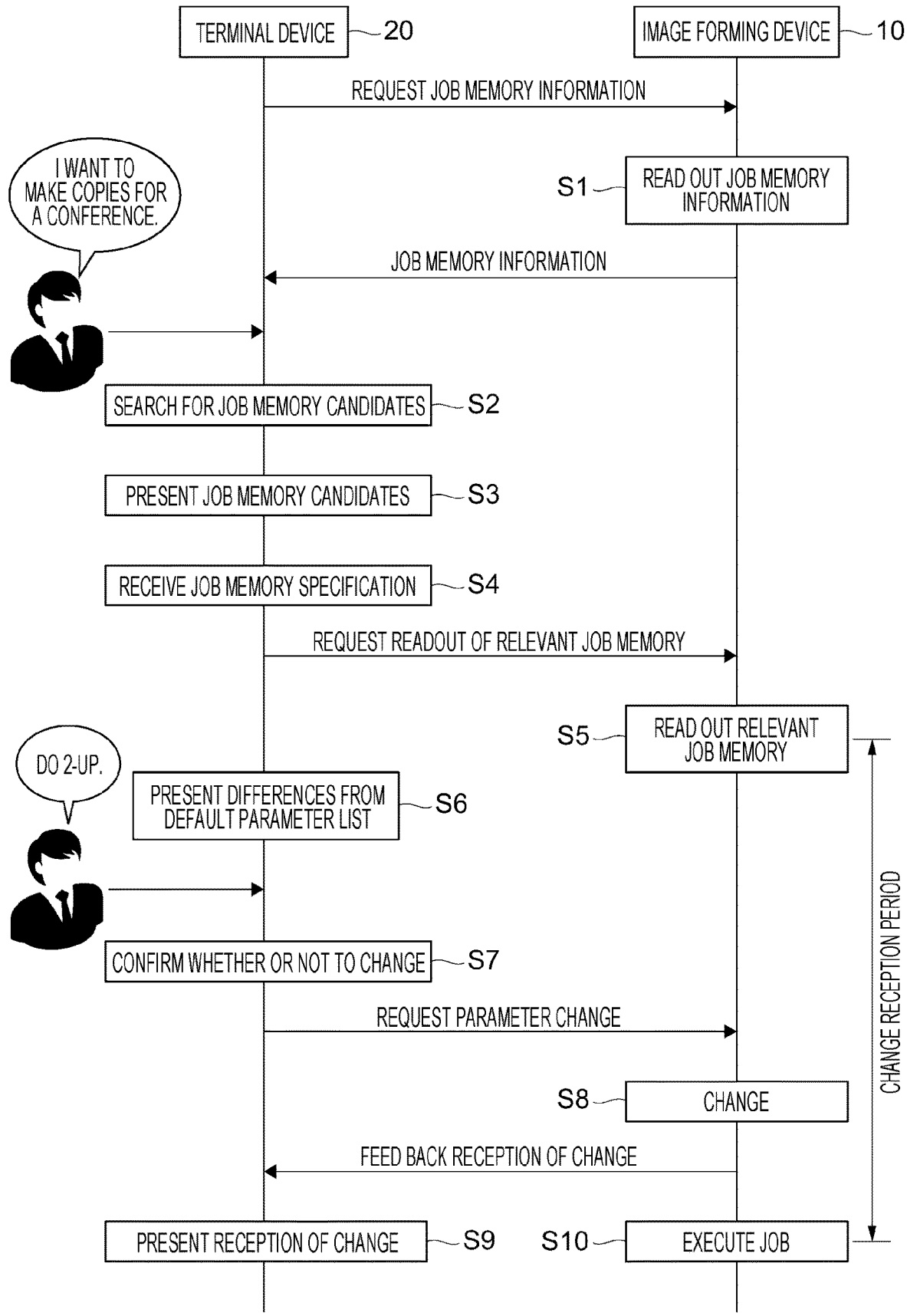
FIG. 9 is a diagram explaining one example of processing operations executed cooperatively by the image forming device and the terminal device.

FIG. 9 is a diagram explaining one example of processing operations executed cooperatively by the image forming device 10 and the terminal device 20. Note that the symbol "S" in the diagram means "step".

The processing operations illustrated in FIG. 9 are started by connecting the image forming device 10 and the terminal device 20 through wireless communication. For example, communication between the terminal device 20 and the image forming device 10 is started by having the user carrying the terminal device 20 approach the image forming device 10. As described earlier, the image forming device 10 to connect to is a single device.

When a communicable state is reached, in the terminal device 20, an application program that assists with setting reading out a job memory and setting parameters by the user is launched. When the application program is launched, a request for job memory information is issued from the terminal device 20 to the image forming device 10.

The image forming device 10 receiving the request reads out the job memory information (step 1). The read-out job memory information is transmitted from the image forming device 10 to the requesting terminal device 20. Even if multiple terminal devices 20 exist in the same space, the recipient of the transmitted job memory information is limited to the terminal device 20 that requested the job memory information.

In the example of FIG. 9, at this stage, the user speaks to the terminal device 20 and says "I want to make copies for a conference." The terminal device 20 detecting the utterance recognizes the uttered speech, and uses one or more words included in the speech as a search key to search for one or more job memory candidates (step 2).

Next, the terminal device 20 presents the one or more job memory candidates found by the search (step 3). In some cases, only one job memory candidate is found, whereas in other cases, multiple job memory candidates are found. The presentation of job memory candidates involves displaying the job memory names only or displaying the job memory names and representative parameter values, for example. The number of displayed parameter values depends on the size of the display area allocated to the display of candidates.

After that, the terminal device 20 receives a specification of a job memory by the user (step 4). The terminal device 20 receiving the specification requests the image forming device 10 to read out the corresponding job memory. The read-out request includes a number and the job memory name specifying the job memory, for example.

The image forming device 10 receiving the request reads out the corresponding job memory from the storage unit 105 (see FIG. 2) (step 5). By reading out the job memory, the parameter values of the corresponding job memory are set in the image forming device 10.

In the case of the present exemplary embodiment, the image forming device 10 starts the change reception period from the point in time of reading out the corresponding job memory, and defers the execution of the job memory.

On the other hand, in the terminal device 20 receiving the specification of the specific job memory by the user, the parameter list of the specified job memory and the default parameter list are compared.

The terminal device 20 presents the differences between the parameter list of the job memory specified by the user and the default parameter list as a result of the comparison (step 6).

Through the presentation of the differences, it becomes easy to grasp the features of the specified job memory.

In the example of FIG. 9, the user wants to change a parameter, and says "Do 2-Up." In other words, the user wants to change to a setting that fits two pages of the document onto a single sheet of paper.

The terminal device 20 recognizing the utterance by the user confirms whether or not the recognized change is possible (step 7).

In the case where the change is possible, the terminal device 20 requests the image forming device 10 to change the parameter. In the image forming device 10 receiving the parameter request, a check is performed to confirm that the requesting terminal device 20 is identical to the terminal device 20 that read out the job memory currently being deferred. In the case of confirming the identity of the terminal device 20, the image forming device 10 changes the parameter in accordance with the request (step 8). In this example, the parameter value is changed from "1-Up" to "2-Up". The reception of the change is fed back from the image forming device 10 to the terminal device 20.

The terminal device 20 receiving the feedback presents the reception of the change (step 9). Meanwhile, the image forming device 10 waits for the change reception period to elapse, cancels the deferred state, and executes the job with the changed content (step 10). Note that in the case in which a change instruction is not given, after the change reception period elapses, the job is executed on the basis of the parameter values set in the job memory that was read out in step 5.

<Operations that Assist with Re-Executing a Job Memory>

Figure 10:
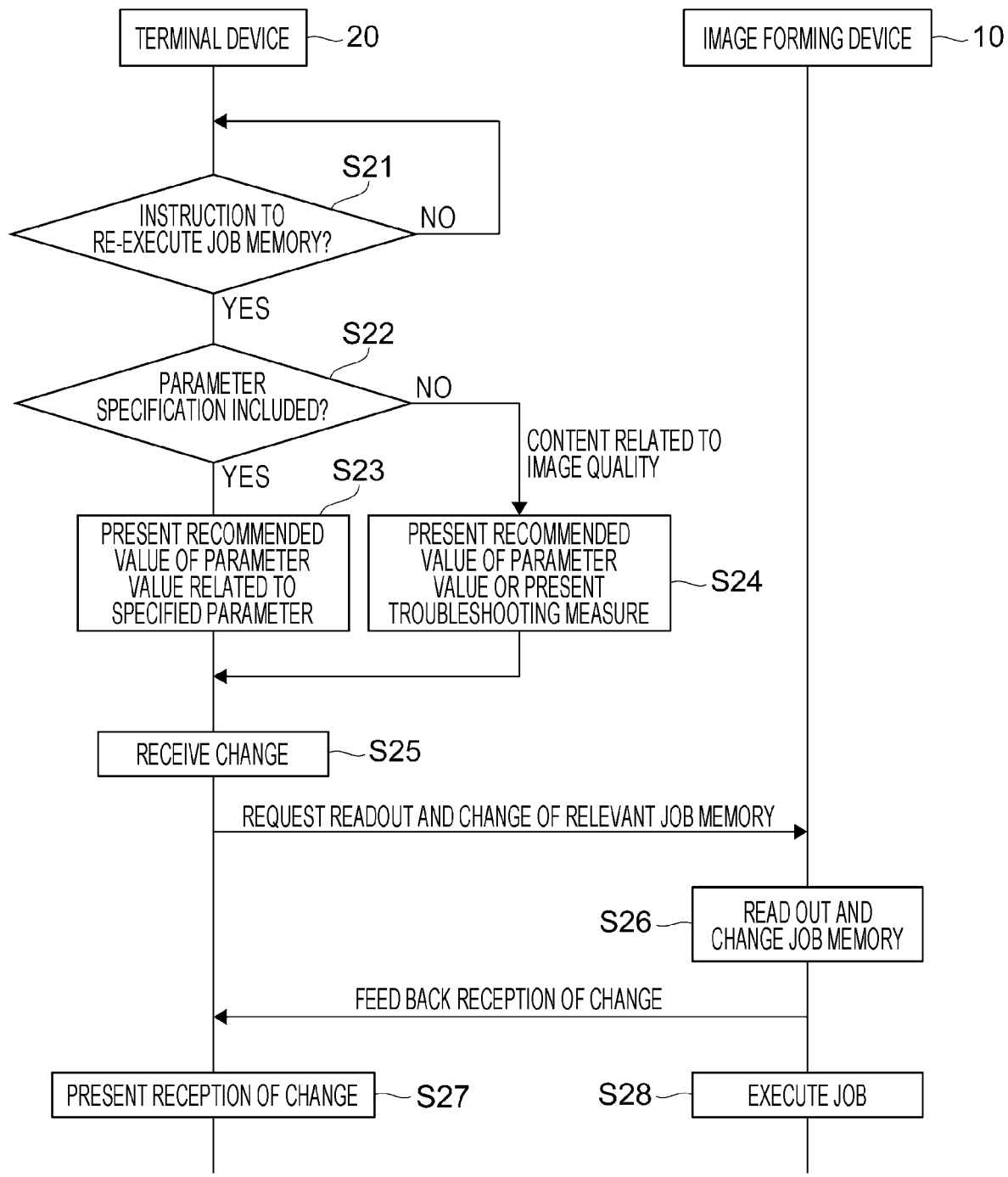
FIG. 10 is a diagram explaining another example of processing operations executed cooperatively by the image forming device and the terminal device.

FIG. 10 is a diagram explaining another example of processing operations executed cooperatively by the image forming device 10 and the terminal device 20. Note that the symbol "S" in the diagram means "step".

As described above, in some cases, the user is dissatisfied with the result of executing the job memory or the result of partially changing and executing the job memory. The operations illustrated in FIG. 10 anticipate a case in which the user is dissatisfied with the content of the executed job.

The terminal device 20 connected to the image forming device 10 by wireless communication determines whether or not the content of a user utterance is an instruction to re-execute the job memory (step 21). As described earlier, whether or not the content is an instruction to re-execute is determined from the context of the uttered content. In the case in which a negative result is obtained in step 21, the terminal device 20 stands by for the next utterance.

In the case in which a positive result is obtained in step 21, the terminal device 20 determines whether or not a parameter specification is included in the content of the utterance (step 22). For example, in the case in which an expression giving a direct instruction to change a parameter such as "I want to make it darker" or "I want to make it lighter" is included, the terminal device 20 obtains a positive result.

In the case in which a positive result is obtained in step 22, the terminal device 20 presents a recommended value of the parameter value related to the specified parameter (step 23). For example, for the parameter value of density, "+1" or "−1" is presented as a recommended value for getting closer to the user's desired output.

On the other hand, in the case in which a negative result is obtained in step 22, the terminal device 20 proceeds to step 24. In the case in which content related to image quality is included in the user utterance, a negative result is obtained in step 22.

The cause of the user judging the image quality to be inexpedient is estimated through voice interaction with the user in cases where image data of the image log or the like is not usable, or by analysis of the image log or the like in cases where image data of the image log or the like is usable.

After estimating the cause, the terminal device 20 presents recommended values of parameter values, or presents troubleshooting measures (step 24).

After the presentation according to step 23 or step 24, the terminal device 20 receives a change by the user. In other words, the terminal device 20 receives a change to a parameter value used in the job executed the last time (step 25).

After that, the terminal device 20 requests the image forming device 10 to read out and change the corresponding job memory. The image forming device 10 receiving the request reads out and changes the job memory on the basis of the request (step 26). Specifically, the parameter values of the read-out job memory are partially changed in accordance with the request. The reception of the change is fed back from the image forming device 10 to the terminal device 20.

The terminal device 20 receiving the feedback presents the reception of the change (step 27). Meanwhile, the image forming device 10 executes the job with the changed content (step 28). In the case of re-execution, the change reception period is not set.

<Operations that Assist with Saving as a New Job Memory>

Figure 11:
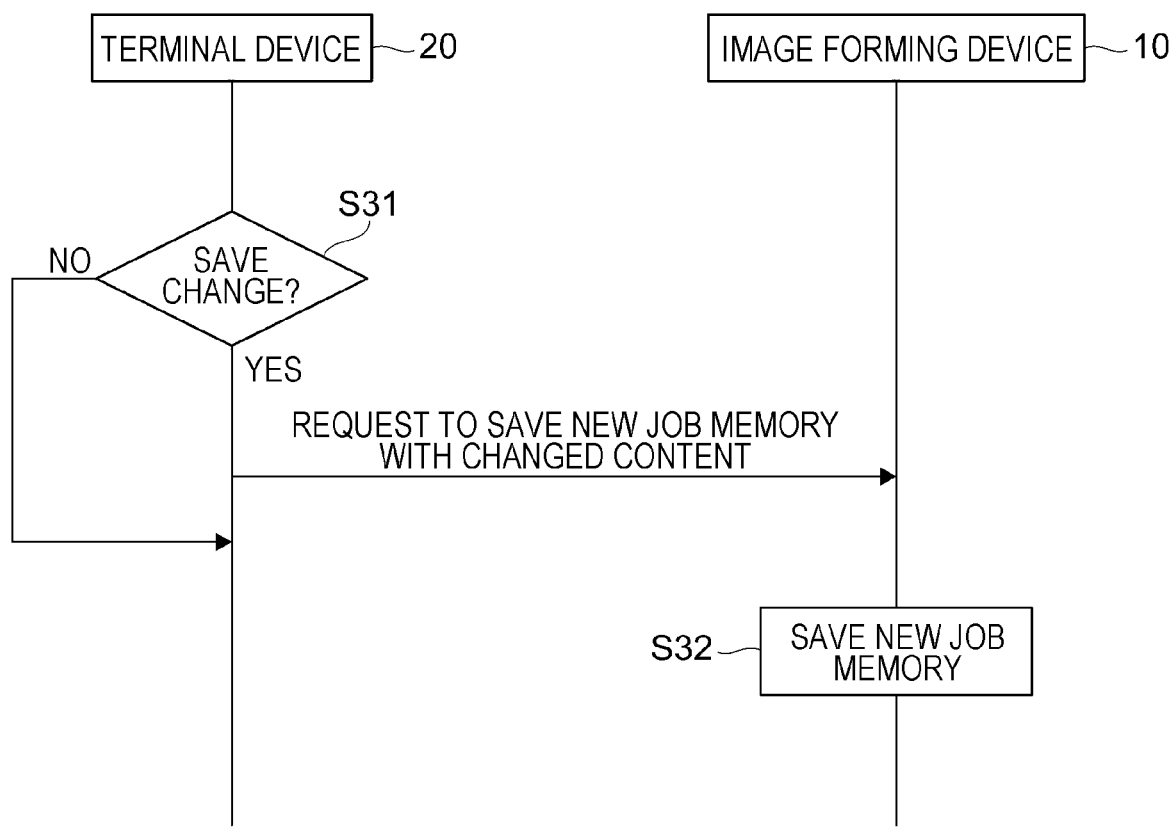
FIG. 11 is a diagram explaining another example of processing operations executed cooperatively by the image forming device and the terminal device.

FIG. 11 is a diagram explaining another example of processing operations executed cooperatively by the image forming device 10 and the terminal device 20. Note that the symbol "S" in the diagram means "step".

The operations illustrated in FIG. 11 are executed following step 9 in FIG. 9 or following step 27 illustrated in FIG. 10, for example.

The terminal device 20 presenting the reception of the change determines whether or not saving the changed content is desired (step 31).

In the case in which a negative result is obtained in step 31, the terminal device 20 ends the operations without saving the changed content as a new job memory in the image forming device 10.

In the case in which a positive result is obtained in step 31, the terminal device 20 requests the image forming device 10 to save a new job memory with the changed content.

The image forming device 10 receiving the request saves a new job memory in accordance with the request (step 32).

In the example of FIG. 11, the saving of the change is determined by presupposing a voluntary utterance by the user, but the user may also be queried by the terminal device 20 side about whether to save the changed content as a new job memory.

<Examples of Operating Screens>

Hereinafter, examples of operating screens displayed on the terminal device 20 in association with the execution of the operations described above will be described.

<Screen 1: Case of a Single Job Memory Candidate>

Figure 12:
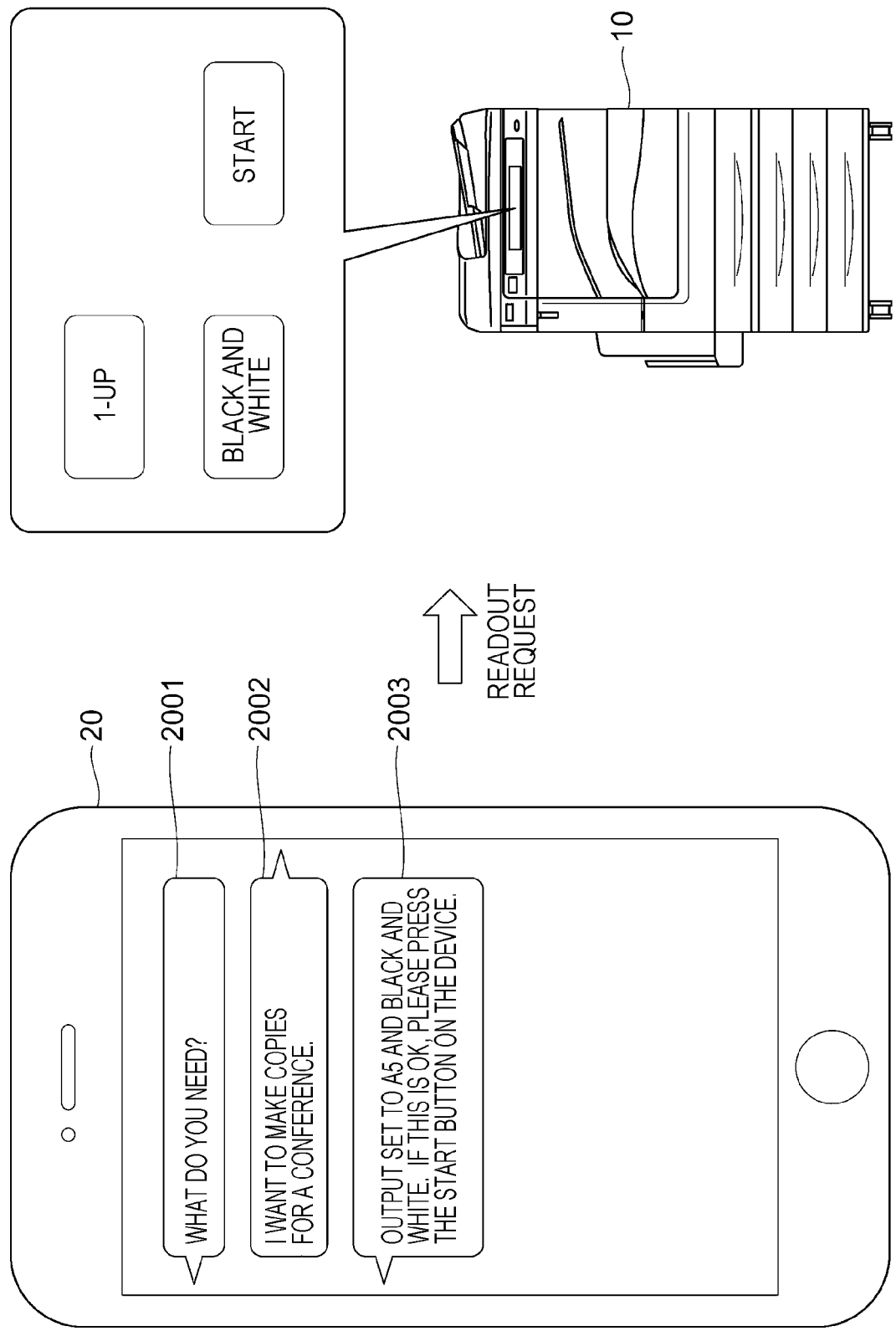
FIG. 12 is a diagram explaining an example of an operating screen in a case of being able to specify one job memory candidate from the content of an utterance by a user.

FIG. 12 is a diagram explaining an example of an operating screen in a case of being able to specify one job memory candidate from the content of an utterance by the user. Note that the operating screen illustrated in FIG. 12 corresponds to the point in time of step 7 (see FIG. 9).

In the case of FIG. 12, the content of utterances from the application program executed in the terminal device 20 is displayed along the left side of the operating screen, while the content of utterances from the user is displayed along the right side of the operating screen.

In the case of FIG. 12, on the operating screen of the terminal device 20, an utterance 2001 by the application program saying "What do you need?" is displayed, and after that, an utterance 2002 by the user saying "I want to makes copies for a conference." is displayed.

On the operating screen of the terminal device 20, the content of these utterances is displayed in a time series. In this example, there is only one corresponding job memory. For this reason, at the stage of receiving the user utterance, the image forming device 10 is requested to read out the job memory corresponding to "copies for a conference".

By reading out the job memory, a portion of the parameter values of the corresponding job memory are displayed on the operating screen of the image forming device 10. In the example of FIG. 12, the displayed parameter values are "1-Up" and "Black and White". Note that a "Start" button is also displayed on the operating screen of the image forming device 10.

In the case of the present exemplary embodiment, the differences between the parameter list for "copies for a conference" and the default parameter list are the color mode parameter value and the paper size parameter value. For this reason, on the operating screen in FIG. 12, "Output set to A5 and black and white. If this is OK, please press the Start button on the device." is displayed as an utterance 2003 from the application program side.

<Screen 2: Case of Multiple Job Memory Candidates>

FIG. 13 is a diagram explaining an example of operating screen transitions in a case of finding multiple job memory candidates corresponding to the content of an utterance by the user.

On the operating screen at a time T1, an utterance 2011 by the application program saying "What do you need?" is displayed, and after that, an utterance 2012 by the user saying "I want to make copies" is displayed.

On the operating screen at a time T2, a presentation field 2013 of candidates found by search and an utterance 2014 by the application program saying "Several candidates were found" are displayed. The operating screen at time T2 corresponds to step 3 (see FIG. 9).

In the case of FIG. 13, three candidates are illustrated in the presentation field 2013. Namely, the three candidates "Conference copy", "Presentation copy", and "Economy copy" are illustrated.

In the case of FIG. 13, for each candidate, a portion of the parameter values of the corresponding job memory is displayed. For example, for "Conference copy", "Black and white" is displayed. Also, for "Presentation copy", "Full color" and "Staple" are displayed. Also, for "Economy copy", "Black and white", "Duplex", and "2-Up" are displayed. The parameter values illustrated at this point in time are not differences from the default parameter list.

The operating screens at a time T3 illustrate a state of the user selecting a candidate. The upper operating screen corresponds to the case of indicating the selection of a candidate by tapping a specific button displayed in the presentation field 2013. Herein, "Economy copy" is selected. The lower operating screen corresponds to the case of indicating the selection of a candidate through speech. In the example of FIG. 13, an utterance 2015 saying "Do economy copy." is displayed.

<Screen 3: Case of Multiple Job Memory Candidates with History of Many Changes>

Figure 14:
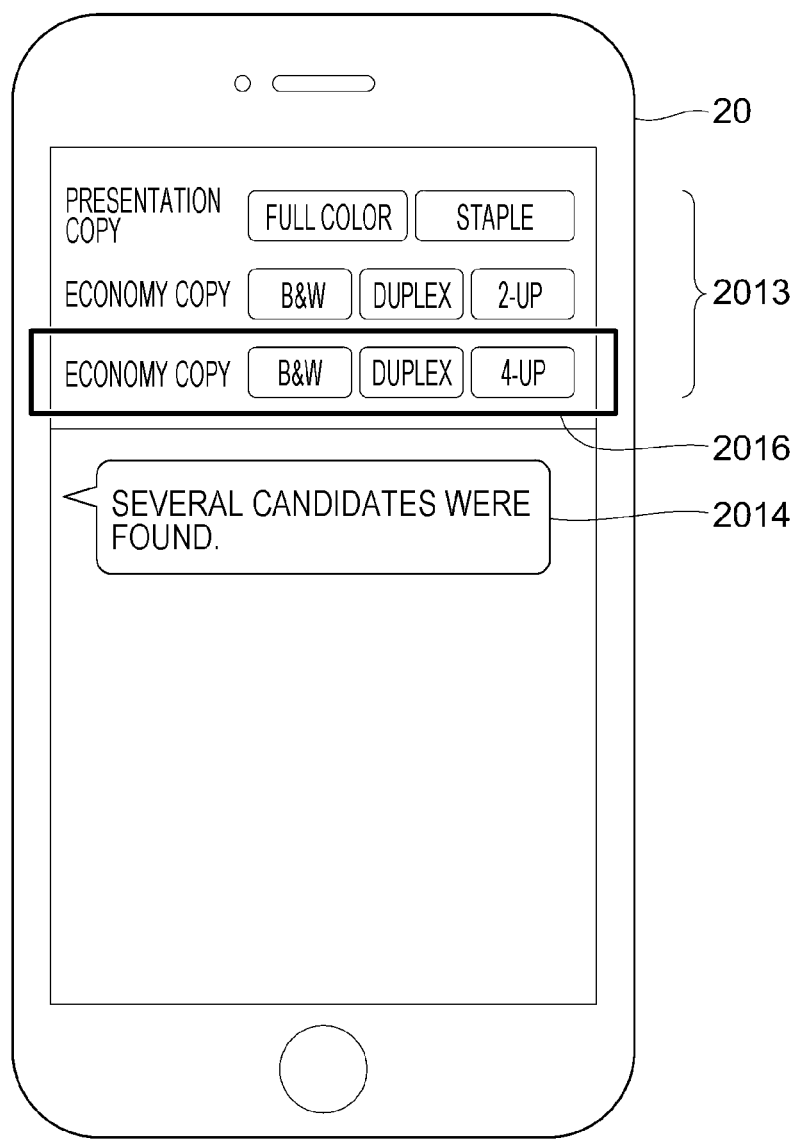
FIG. 14 is a diagram explaining an example of an operating screen in a case of finding a history of many partial changes to a job memory candidate found from the content of an utterance by the user.

FIG. 14 is a diagram explaining an example of an operating screen in a case of finding a history of many partial changes to a job memory candidate found from the content of an utterance by the user. The operating screen illustrated in FIG. 14 corresponds to the operating screen at time T2 in FIG. 13.

The operating screen illustrated in FIG. 14 is displayed in the case in which the history of partial changes to the parameter values of "Economy copy" satisfy a predetermined standard. Herein, a case is anticipated in which the number of times that the parameter value has been changed from "2-Up" to "4-Up" in the history exceeds a predetermined threshold value.

The bold line 2016 in the diagram is a fictitious candidate displayed on the basis of the history of changes. The fictitious candidate is a candidate that does not actually exist in the image forming device 10 (see FIG. 1), but has a high probability of being used by the user. In the case in which this candidate is specified by the user, the terminal device 20 requests the image forming device 10 to read out "Economy copy" and change the parameter value.

<Screen 4: Changing Parameter Value According to User Utterance>

Figure 15:
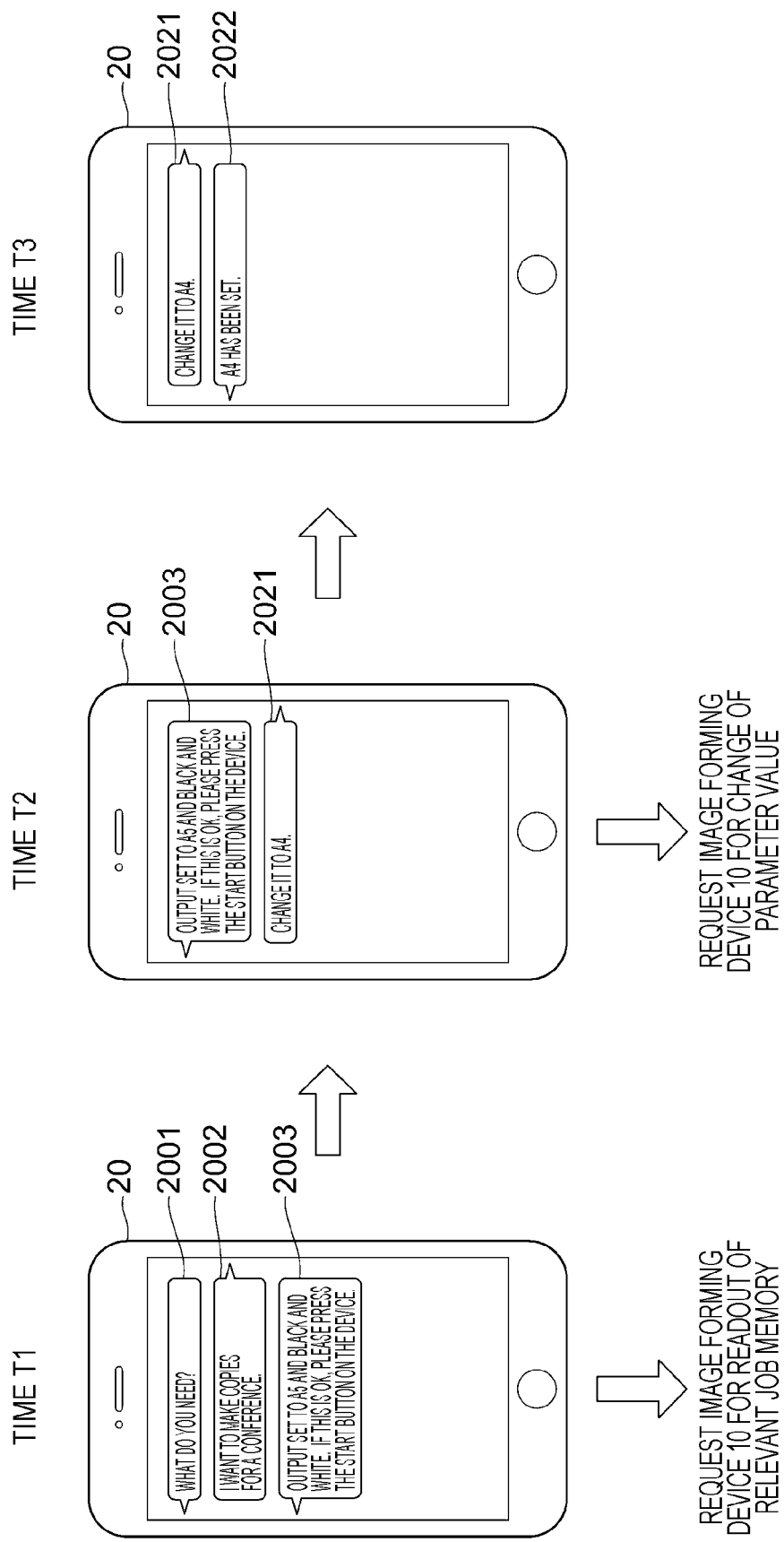
FIG. 15 is a diagram explaining an example of operating screen transitions in a case where the user partially changes the parameter values in a found candidate.

FIG. 15 is a diagram explaining an example of operating screen transitions in a case where the user partially changes the parameter values in a found candidate.

The operating screen illustrated at time T1 is the same as the operating screen illustrated in FIG. 12. On the operating screen illustrated at time T1, the differences between the parameter list of the candidate and the default parameter list are displayed. Specifically, "Output set to A5 and black and white. If this is OK, please press the Start button on the device." is displayed. At this point in time, the terminal device 20 requests the image forming device 10 to read out the corresponding job memory.

The operating screen illustrated at time T2 is the case in which the user indicates changing the paper size. Herein, "Change it to A4" is displayed as an utterance 2021 by the user. The terminal device 20 receiving the utterance 2021 by the user requests the image forming device 10 to change the parameter value.

The operating screen illustrated at time T3 indicates that the change of the parameter value has been received by the image forming device 10. Herein, "A4 has been set." is displayed as an utterance 2022 from the application program side.

<Screen 5: Selecting a Candidate and Changing a Parameter Value at the Same Time According to User Utterance>

Figure 16:
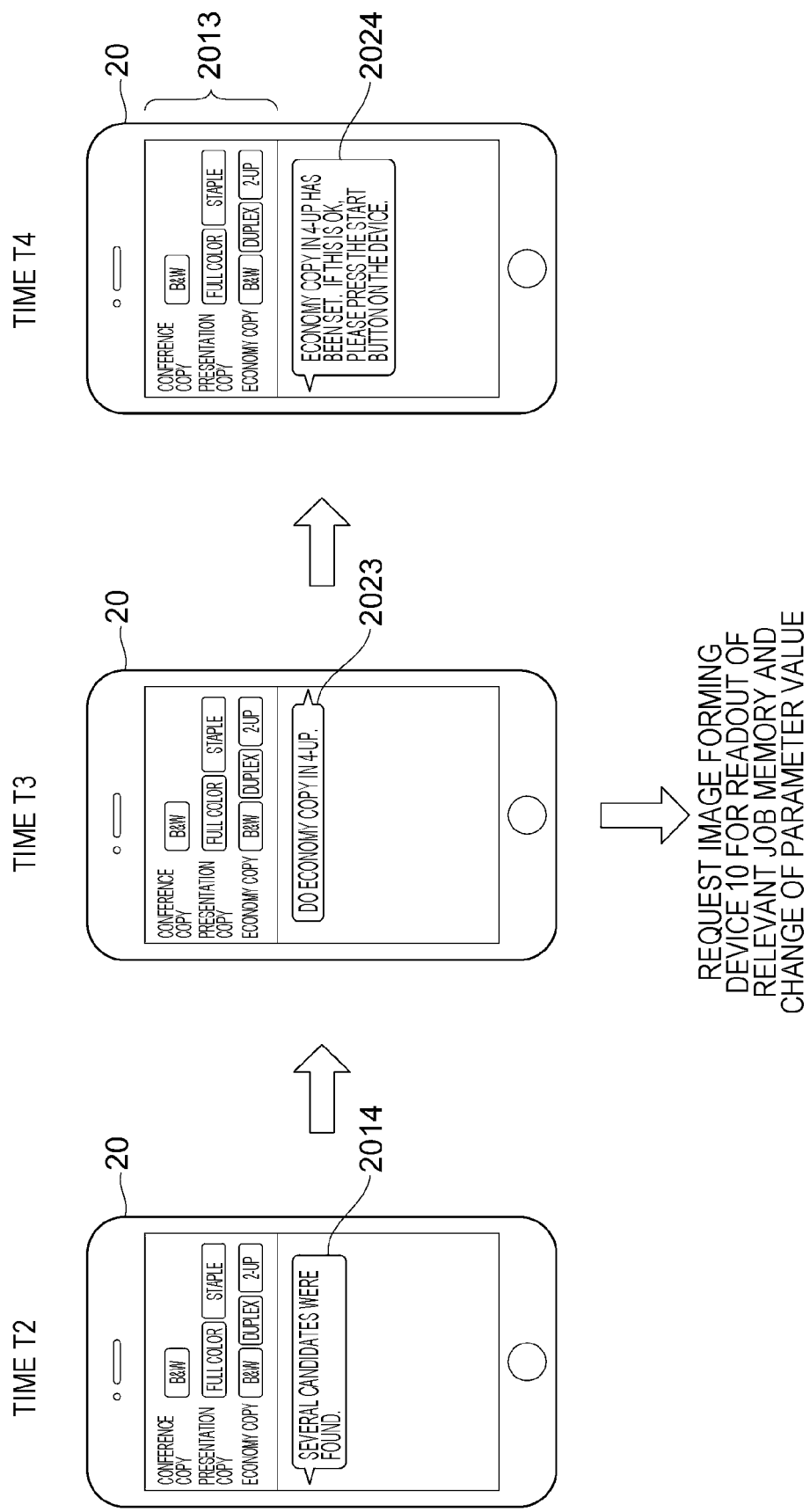
FIG. 16 is a diagram explaining an example of operating screen transitions in a case where the user selects one from among multiple candidates and at the same time gives an instruction to partially change the parameter values.

FIG. 16 is a diagram explaining an example of operating screen transitions in a case where the user selects one from among multiple candidates and at the same time gives an instruction to partially change the parameter values.

The operating screen illustrated at time T2 is the same as the operating screen at time T2 in FIG. 13.

At time T3, the user gives an instruction through speech. In the case of FIG. 16, the user gives an instruction that selects a candidate and changes a parameter value at the same time. For this reason, on the operating screen at time T3, an utterance 2023 by the user saying "Do economy copy in 4-up." is displayed. At this point in time, the terminal device 20 requests the image forming device 10 to read out the corresponding job memory and change the parameter value.

The operating screen illustrated at time T4 indicates that the change of the parameter value has been received by the image forming device 10. Herein, "Economy copy in 4-up has been set. If this is OK, please press the Start button on the device." is displayed as an utterance 2024 from the application program side.

<Screen 6: Displaying Job Memory Candidate and Candidates for Changing Parameter Values>

Figure 17:
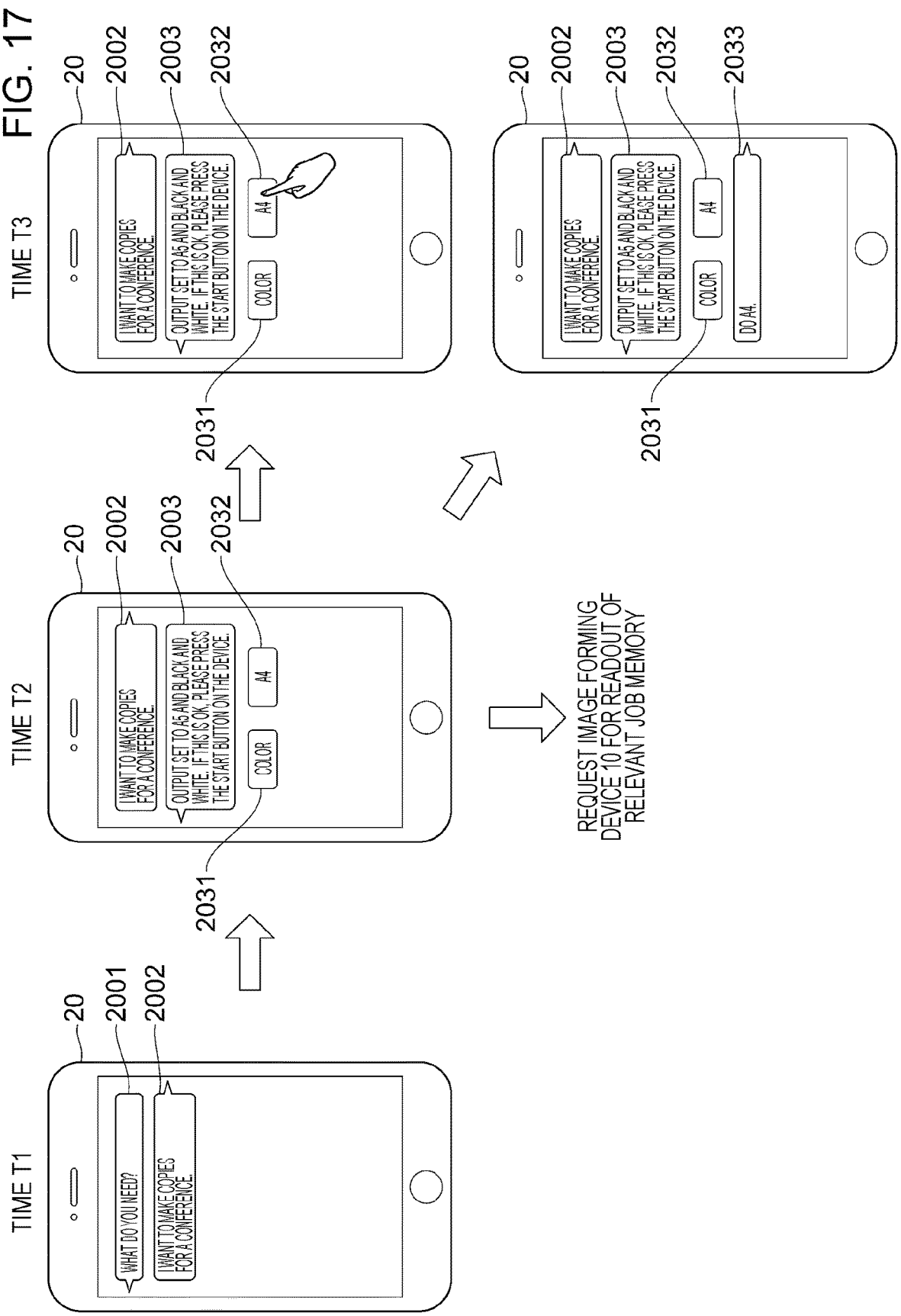
FIG. 17 is a diagram explaining an example of operating screen transitions in a case where the user selects one from among multiple candidates and gives an instruction to partially change the parameter values.

FIG. 17 is a diagram explaining an example of operating screen transitions in a case where the user selects one from among multiple candidates and gives an instruction to partially change the parameter values.

On the operating screen at a time T1, the utterance 2001 by the application program saying "What do you need?" is displayed, and after that, the utterance 2002 by the user saying "I want to make copies for a conference" is displayed.

In the case of FIG. 17, there is only one job memory corresponding to the utterance 2002 by the user.

For this reason, on the operating screen at time T2, the utterance 2003 indicating the differences between the parameter list of the specified job memory and the default parameter list is displayed. Additionally, on the operating screen at time T2, two buttons 2031 and 2032 expressing candidates for changing parameter values extracted from a history of operations are displayed. The button 2031 is "Color", and the button 2032 is "A4".

At this point in time, the terminal device 20 requests the image forming device 10 to read out the corresponding job memory.

The operating screens at a time T3 illustrate a state of the user selecting a candidate. The upper operating screen corresponds to the case of giving an instruction to change a parameter value by tapping one of the buttons corresponding to the candidates for changing parameter values. Herein, the button 2032 is tapped, and a change to "A4" is selected. The lower operating screen corresponds to the case of giving an instruction to change a parameter value through speech. In the example of FIG. 17, an utterance 2033 saying "Do A4." is displayed.

At this point in time, the terminal device 20 requests the image forming device 10 to change the parameter value.

Note that it is also possible to give an instruction for changing multiple parameter values at the same time. For example, it is sufficient to say "Do A4 in color." Additionally, through speech it is also possible to give an instruction for changing a parameter value not being displayed on the operating screen. For example, an instruction may be given by saying "Do simplex." or "Do 4-up."

<Screen 7: Case in which Destination is Included in Parameter Values of Job Memory>

Figure 18:
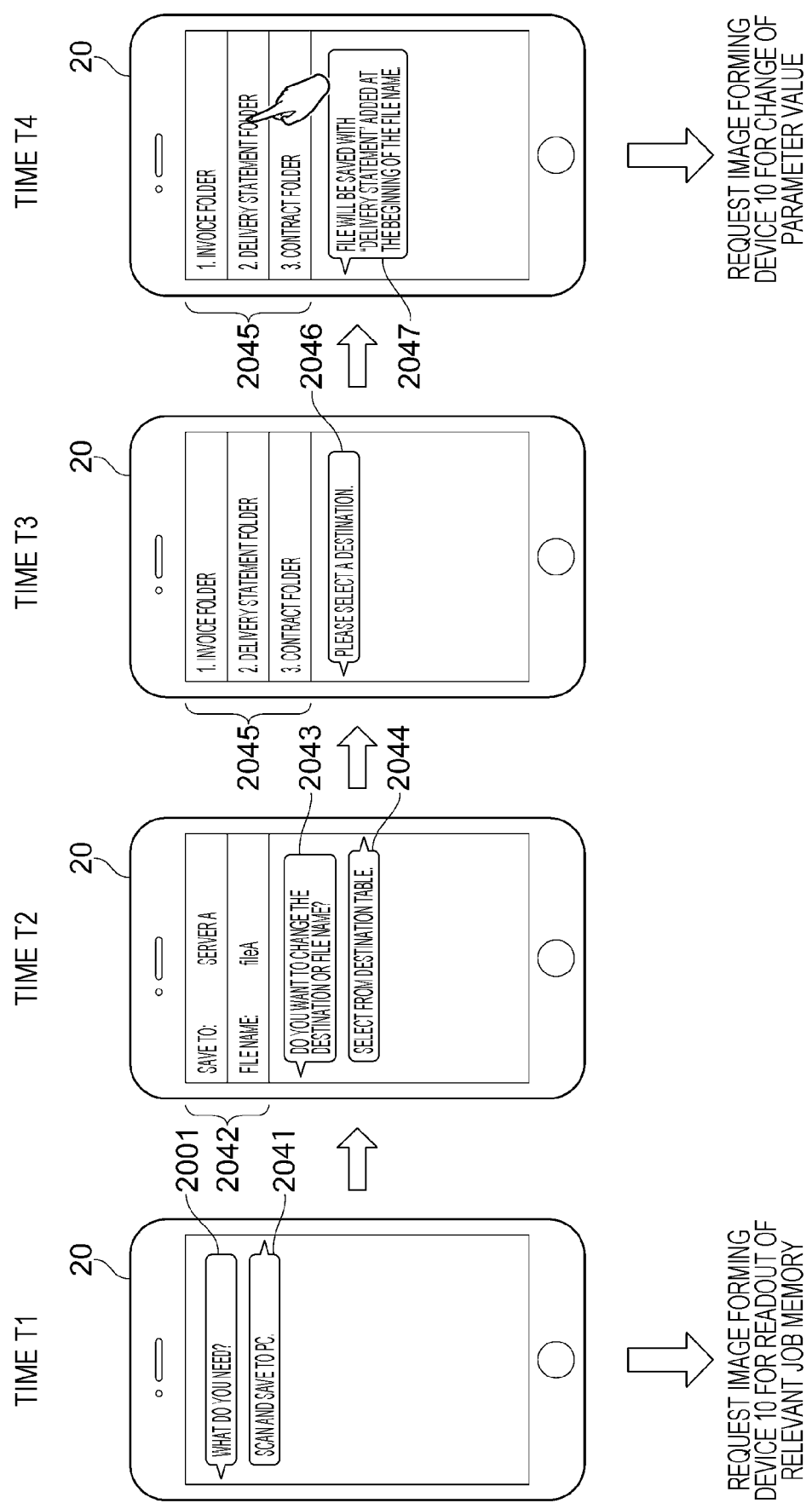
FIG. 18 is a diagram explaining an example of operating screen transitions in a case where a destination is included in the parameter values of a job memory.

FIG. 18 is a diagram explaining an example of operating screen transitions in a case where a destination is included in the parameter values of a job memory.

On the operating screen at a time T1, an utterance 2001 by the application program saying "What do you need?" is displayed, and after that, an utterance 2041 by the user saying "Scan and save to PC" is displayed.

In the case of FIG. 18, there is only one job memory corresponding to the utterance 2041 by the user.

For this reason, the terminal device 20 requests the image forming device 10 to read out the corresponding job memory.

The job memory in this case includes a parameter values specifying the save location of scan data. The save location is one example of a destination. In the present exemplary embodiment, examples of destinations also include a location from which data is read out, a location to which data is transmitted, a communication address, and a shipping address to send documents to or the like. A shipping address includes a recipient name and an address, for example.

As described above, if the destination in the parameter value is different from the destination that the user is expecting, there is a possibility that an unforeseen hindrance may occur.

The operating screen at time T2 is one example of a screen seeking confirmation of the destination from the user. On the first row of the operating screen herein, a save location and file name confirmation field 2042 is displayed. Herein, "Server A" is displayed as the save location, and "fileA" is displayed as the file name.

Note that on the second row, "Do you want to change the destination or file name?" is displayed as an utterance 2043 from the application program.

On the third row, "Select from destination table." is displayed as an utterance 2044 from the user.

The terminal device 20 confirms the utterance 2044 by the user, and acquires the destination table from the image forming device 10.

The operating screen at time T3 is one example of a screen displaying a list of destination candidates. On the first row of the operating screen herein, a destination candidate list 2045 is displayed. Herein, "1. Invoice folder", "2. Delivery statement folder", and "3. Contract folder" are displayed as three candidates for the save location.

Note that on the second row, "Please select a destination." is displayed as an utterance 2046 from the application program.

The operating screen at time T4 is one example of a screen illustrating an example of the selection of a destination by the user. Herein, a selection by the user is input by a tap operation. Specifically, "2. Delivery statement folder" is selected. Note that it is also possible to input the selection of a destination through speech like on Screen 6 (see FIG. 17).

Herein, "File will be saved with "Delivery Statement" added at the beginning of the file name." is displayed as an utterance 2047 from the application program.

At this point in time, the terminal device 20 requests the image forming device 10 to change the parameter value. Also, the terminal device 20 saves a history of changes in the storage unit 202 (see FIG. 4). The terminal device 20 according to the present exemplary embodiment saves a history of the read-out job memory and a history of the change of the destination in association with the content of the utterance by the user. In the case of this example, the read-out of "Scan to PC" and the selection of "Delivery statement folder" are associated with the utterance 2041 saying "Scan and save to PC."

By saving this history, a simplification of the next presentation is achieved.

Figure 19:
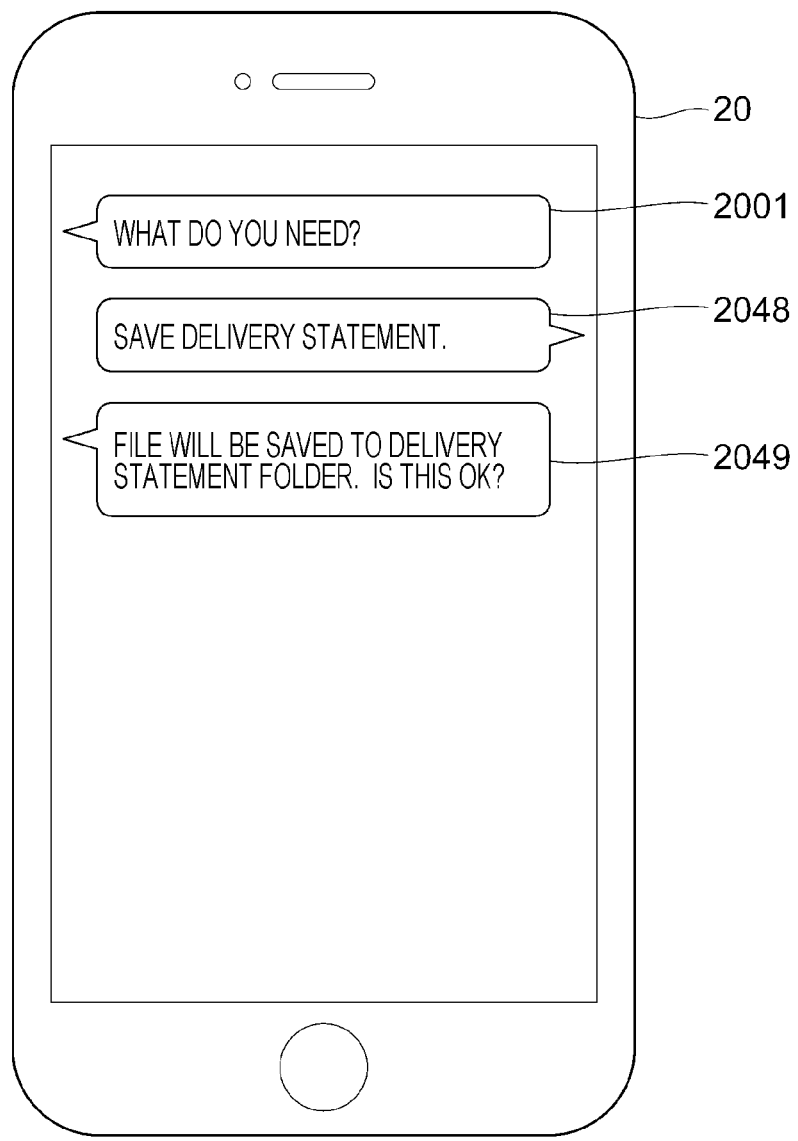
FIG. 19 is a diagram explaining an example of an operating screen in a case where a job memory including a destination in the parameter values is read out multiple times.

FIG. 19 is a diagram explaining an example of an operating screen in a case where a job memory including a destination in the parameter values is read out multiple times.

The operating screen in FIG. 19 corresponds to the operating screen at time T1 in FIG. 18. On the operating screen of FIG. 19, the number of voice interactions is reduced by referencing the history of changes so far.

In the case of FIG. 19, in response to the utterance 2001 by the application program saying "What do you need?", the user says an utterance 2048 saying "Save delivery statement."

Although the content of the utterance 2048 differs from the job memory name, by cross-referencing "delivery statement" and "save" contained in the utterance 2048 with the history of changes, the terminal device 20 estimates that the user wants to "Save to PC".

Accordingly, in the example of FIG. 19, "File will be saved to delivery statement folder. Is this OK?" is displayed as an utterance 2049 from the application program.

This display is one example of a presentation of a candidate using the history of changes.

<Screen 8: Saving a Changed Job Memory>

Figure 20:
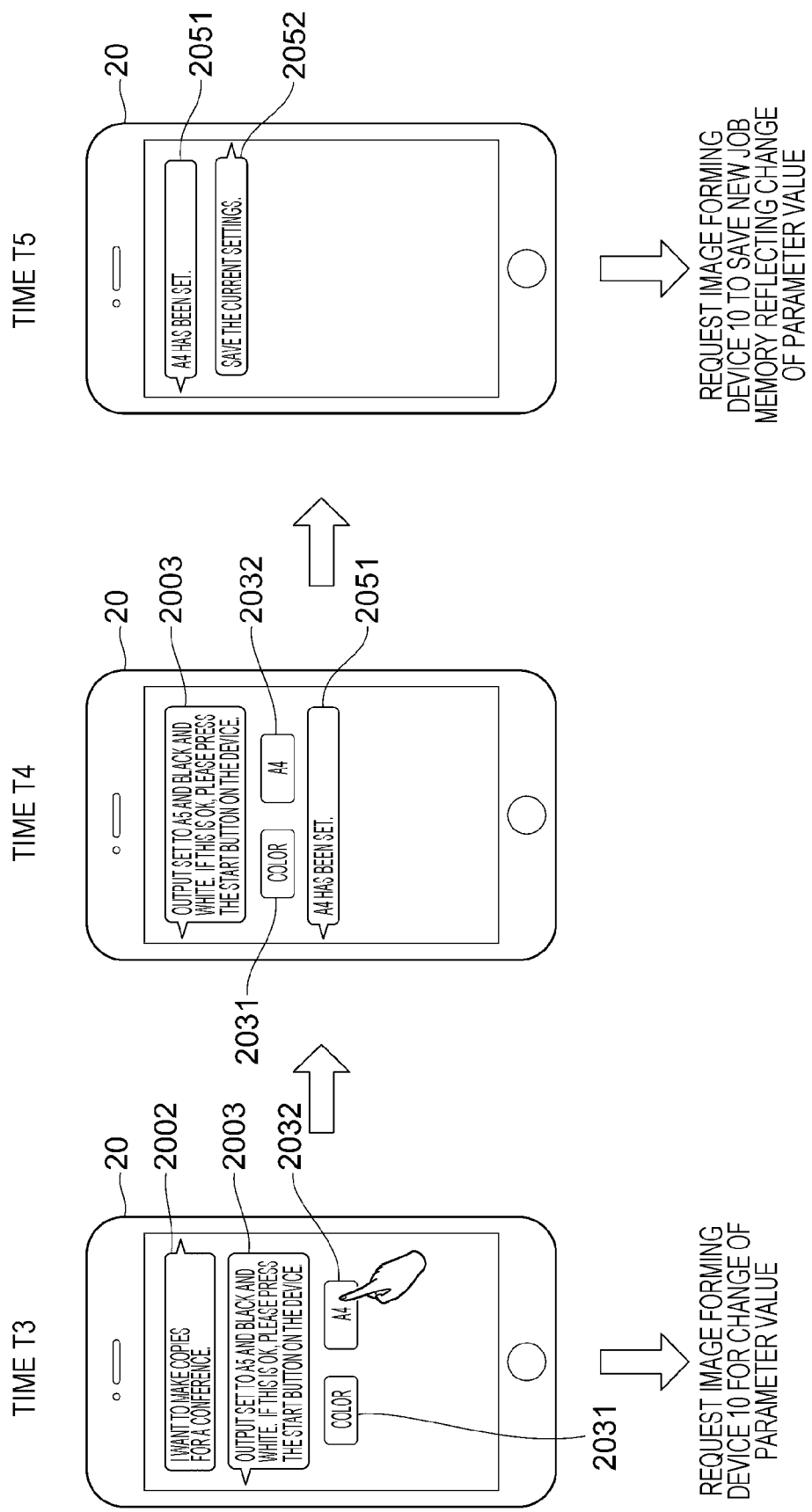
FIG. 20 is a diagram explaining an example of operating screen transitions in a case where a job memory with partially changed parameter values is saved as a new job memory.

FIG. 20 is a diagram explaining an example of operating screen transitions in a case where a job memory with partially changed parameter values is saved as a new job memory.

The operating screen illustrated at time T3 corresponds to the operating screen at time T3 in FIG. 17.

The change of a parameter value described above is a change limited to the current execution, and is not a change to the content of the job memory saved in the image forming device 10 (see FIG. 1).

Herein, one example of operations will be described for the case of saving the changed content as a new job memory in preparation for execution the next time and thereafter.

At time T4, "A4 has been set." is displayed as feedback 2051 indicating that the instruction to change given by the user has been reflected in the image forming device 10.

In the case of time T5, the user confirming the feedback 2051 issues a verbal instruction to save a job memory reflecting the changed parameter value. Specifically, "Save the current settings." is displayed as an utterance 2052 by the user.

The terminal device 20 receiving the instruction by the user requests the image forming device 10 to save a new job memory reflecting the change of the parameter value. As a result, in the image forming device 10, a new "Conference copy" with a different value of the paper size from the existing "Conference copy" is saved.

In the example of FIG. 20, the request to save a new job reflecting the change of the parameter value is issued when the user says the utterance 2052, but the user may also be queried by the terminal device 20 side about whether the user wants to save a new job memory reflecting the change of the parameter value. For example, a querying stating "Do you want to save the current settings as a new job memory?" may be presented from the application program side.

<Screen 9: Example of Screens Displayed when Re-Executing Job Memory>

Figure 21:
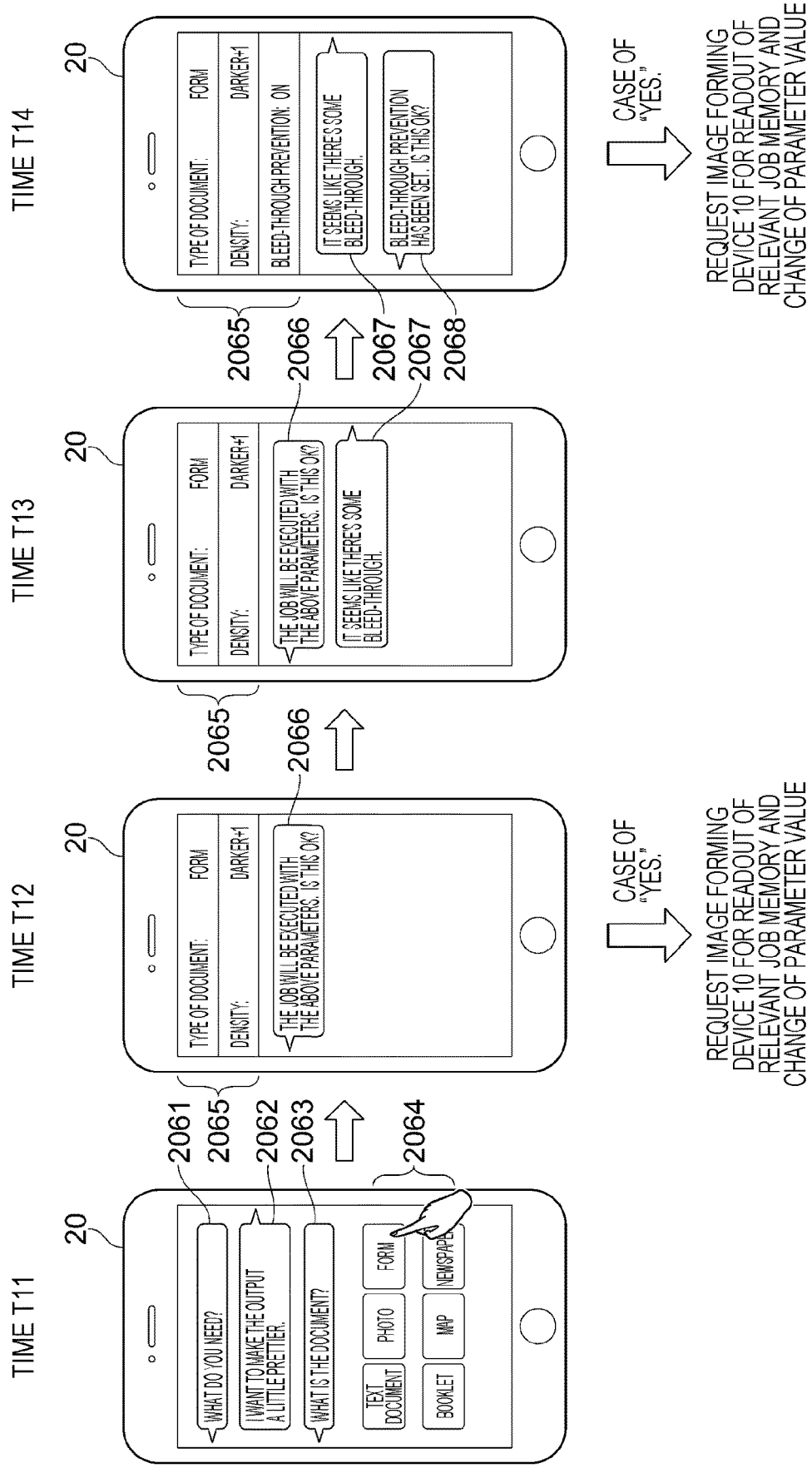
FIG. 21 is a diagram explaining an example of operating screen transitions in a case where an intention to re-execute a job memory is uttered.

FIG. 21 is a diagram explaining an example of operating screen transitions in a case where an intention to re-execute a job memory is uttered.

A time T11 corresponds to a point in time after some kind of job memory has been executed in the image forming device 10 (see FIG. 1).

On the operating screen at time T11, an utterance 2061 by the application program saying "What do you need?" is displayed, and after that, an utterance 2062 by the user saying "I want to make the output a little prettier" is displayed. This utterance 2062 includes content related to the image quality of the processing result.

For this reason, the application program reasons that the user wants to re-execute the job, and queries the user for information relevant to presenting recommended parameter values. In this example, an utterance 2063 saying "What is the document?" together with a list 2064 of documents are displayed. In the list 2064, six buttons corresponding to "Text document", "Photo", "Form", "Booklet", "Map", and "Newspaper" are arranged.

In this example, "Form" is selected by the user.

On the first row of the operating screen at a time T12, a presentation field 2065 of recommended parameter values is displayed. In the case of FIG. 21, "Form" is recommended as the type of document parameter value and "Darker+1" is recommended as the density parameter value.

Also, on the second row of the operating screen, an utterance 2066 saying "The job will be executed with the above parameters. Is this OK?" is presented by the application program. At this point in time, if the user makes an utterance saying "Yes.", the terminal device 20 requests the image forming device 10 to read out the corresponding job memory and change the parameter value.

The case of FIG. 21 anticipates the case in which the user makes an utterance saying something other than "Yes."

The operating screen at a time T13 is for the case in which, following the utterance 2066 from the application program side, the user makes an utterance 2067 saying "It seems like there's some bleed-through."

On the operating screen at a time T14, the content of the presentation field 2065 of recommended parameter values is updated. Specifically, a "Bleed-through prevention" item and a corresponding parameter value of "On" are added.

Also, on the operating screen, an utterance 2068 saying "Bleed-through prevention has been set. Is this OK?" is presented by the application program.

At this point in time, if the user makes an utterance saying "Yes.", the terminal device 20 requests the image forming device 10 to read out the corresponding job memory and change the parameter value.

Note that the content of the change associated with the re-execution is saved as a history of operations, and is referenced when reading out the job memory the next time and thereafter.

<Screen 10: Example of Screens Displayed when Re-Executing Job Memory>

The example in FIG. 21 describes a case in which a recommended parameter value by using a user utterance, but herein, a case in which an output image log is usable will be described. The output image log is a log of images of output matter.

Figure 22:
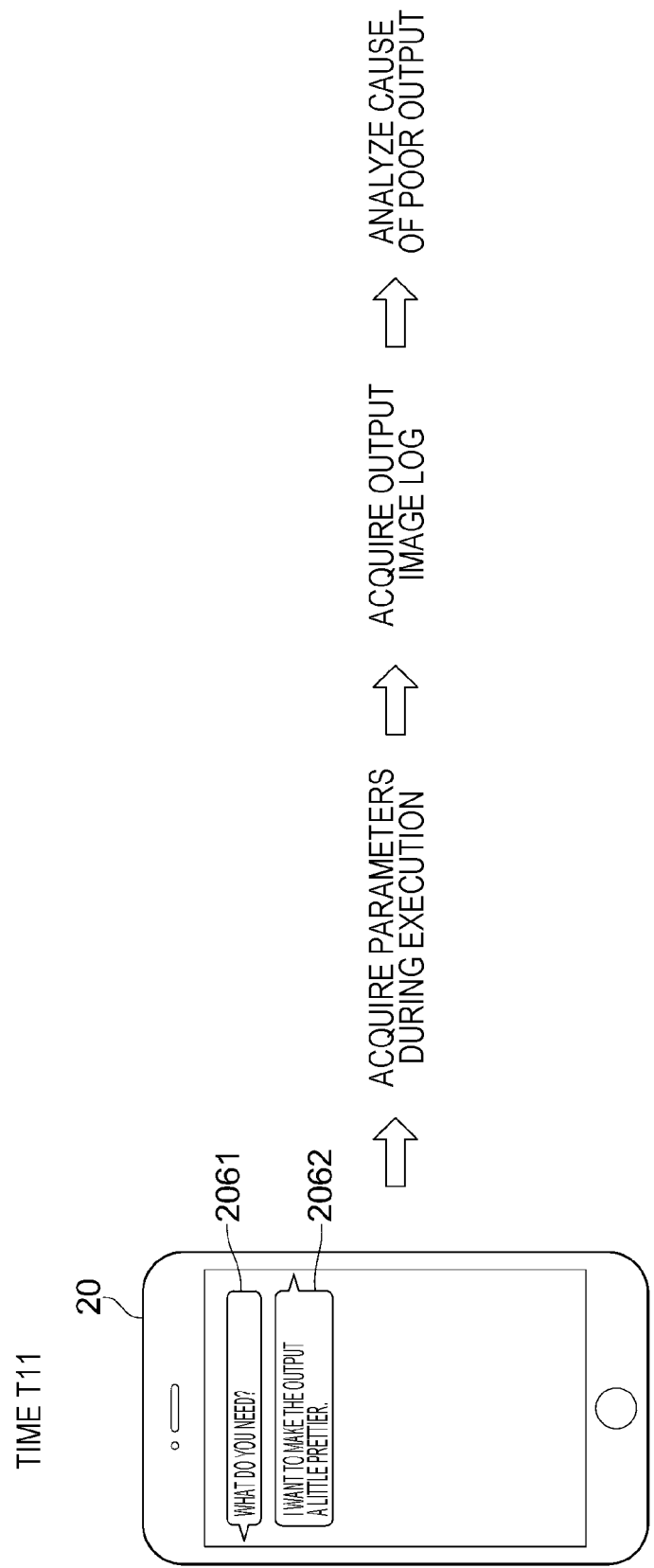
FIG. 22 is a diagram explaining an example of an operating screen in a case where an intention to re-execute a job memory is uttered.

FIG. 22 is a diagram explaining an example of an operating screen in a case where an intention to re-execute a job memory is uttered.

On the operating screen at time T11, the utterance 2061 by the application program saying "What do you need?" is displayed, and after that, the utterance 2062 by the user saying "I want to make the output a little prettier" is displayed. This utterance 2062 includes content related to the image quality of the processing result.

However, on the operating screen herein, because the output image log is usable, the utterance 2063 (see FIG. 21) querying the user about the type of document does not appear.

In this example, the acquisition of parameters executed just before and the acquisition of the output image log are executed as background processes. The output image log is acquired from the image forming device 10 (see FIG. 1).

Next, the terminal device 20 analyzes the cause of inexpedient output on the basis of the acquired parameters and the output image log.

Figure 23:
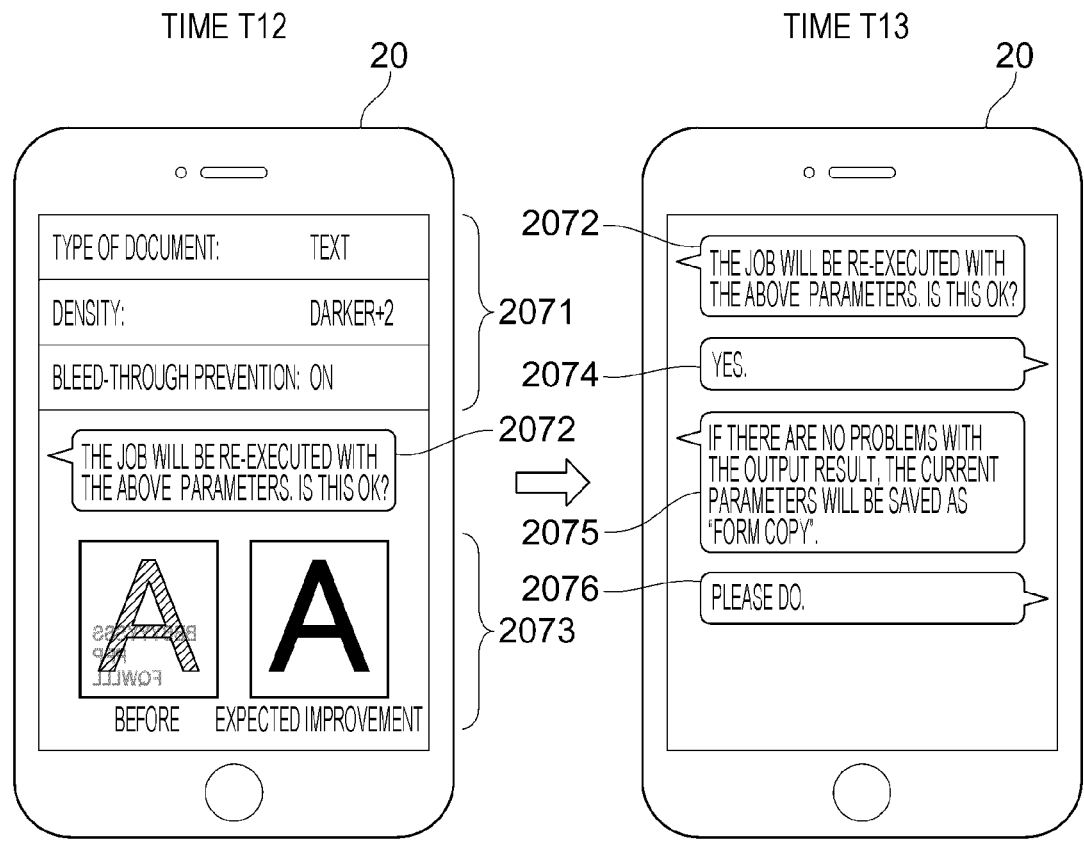
FIG. 23 is a diagram explaining an example of operating screens displayed after the operating screen illustrated in FIG. 22.

FIG. 23 is a diagram explaining an example of operating screens displayed after the operating screen illustrated in FIG. 22.

On the operating screen at time T12, a presentation field 2071 of parameter values recommended as a result of analysis is displayed. In the case of FIG. 23, "Text" is recommended as the type of document parameter value, "Darker+2" is recommended as the density parameter value, and "On" is recommended as the bleed-through prevention parameter value.

Also, on the second row of the operating screen, an utterance 2072 saying "The job will be re-executed with the above parameters. Is this OK?" is presented by the application program. Also, on the third row of the operating screen, an example 2073 of the expected improvement in image quality by applying the recommended parameters is displayed. In this example, an image from before the improvement and an expected image from after the improvement are displayed comparatively. The images at this point do not need to be real images, and may be sample images prepared in advance for presentation. By presenting the expected improvement as an image, it becomes easy to decide whether or not to apply the recommended parameter values.

On the operating screen at time T13, following the utterance 2072 from the application program side, an utterance 2074 by the user saying "Yes." is displayed.

If the user makes an utterance saying "Yes.", the terminal device 20 requests the image forming device 10 to read out the corresponding job memory and change the parameter value.

Furthermore, in this example, an utterance 2075 saying "If there are no problems with the output result, the current settings will be saved as 'Form Copy'" is presented by the application program. At this point, the user wants to save the settings. For this reason, an utterance 2076 saying "Please do." is displayed.

If the user makes an utterance saying "please", the terminal device 20 requests the image forming device 10 to save a new job memory reflecting the change of the parameter value.

Note that the content of the change associated with the re-execution is saved as a history of operations, and is referenced when reading out the job memory the next time and thereafter.

FIG. 24 is a diagram explaining an example of an operating screen in a case where cleaning or the like of the image forming device 10 is presented as a proposed troubleshooting measure by analysis of the cause of inexpedient output.

The example of an operating screen illustrated in FIG. 24 corresponds to time T12 following FIG. 22. The example in FIG. 23 is for the case in which the image quality is improvable by changing parameter values, but in some cases, the image quality is not improvable by changing parameter values.

Herein, an output image 2081 contains a black line-shaped blemish 2082. For this reason, "black lines" is output as an analysis result, and "dirty glass platen" is predicted as the cause.

For this reason, in response to the utterance 2062 by the user saying "I want to make the output a little prettier.", the application program displays an utterance 2083 saying "Please clean the glass platen. For details, please watch the following video. http://Device_cleaning/".

FIG. 25 is a diagram explaining another example of an operating screen in a case where cleaning or the like of the image forming device 10 is presented as a proposed troubleshooting measure by analysis of the cause of inexpedient output.

The operating screen illustrated in FIG. 25 likewise corresponds to time T12 following FIG. 22.

Herein, an output image 2091 contains white line-shaped streaks 2092. For this reason, "white lines" is output as the analysis result, and "dirty scanner" is predicted as the cause.

For this reason, in response to the utterance 2062 by the user saying "I want to make the output a little prettier.", the application program displays an utterance 2093 saying "Please clean the laser scanner. For details, please watch the following video. http://Device_cleaning/".

Exemplary Embodiment 2

<System Configuration>

Exemplary Embodiment 1 described above anticipates a case in which the terminal device 20 is a smartphone, but the present exemplary embodiment anticipates a case in which the terminal device 20 is a wearable terminal.

Examples of wearable terminals include wearable terminals that are worn on the wrist and glasses-style wearable terminals that are worn on the head.

Glasses-style terminals include what are called transmissive terminals that use a transparent plate having an embedded holographic optical element. The holographic optical element has a property of transmitting light incident from the front, and a property of refracting projected light propagated through the interior of the transparent plate and outputting the projected light in the direction of a user's eye. For this reason, the user wearing a glasses-style terminal is able to see an image in which a virtual image or text is superimposed onto a real object.

Figure 26:
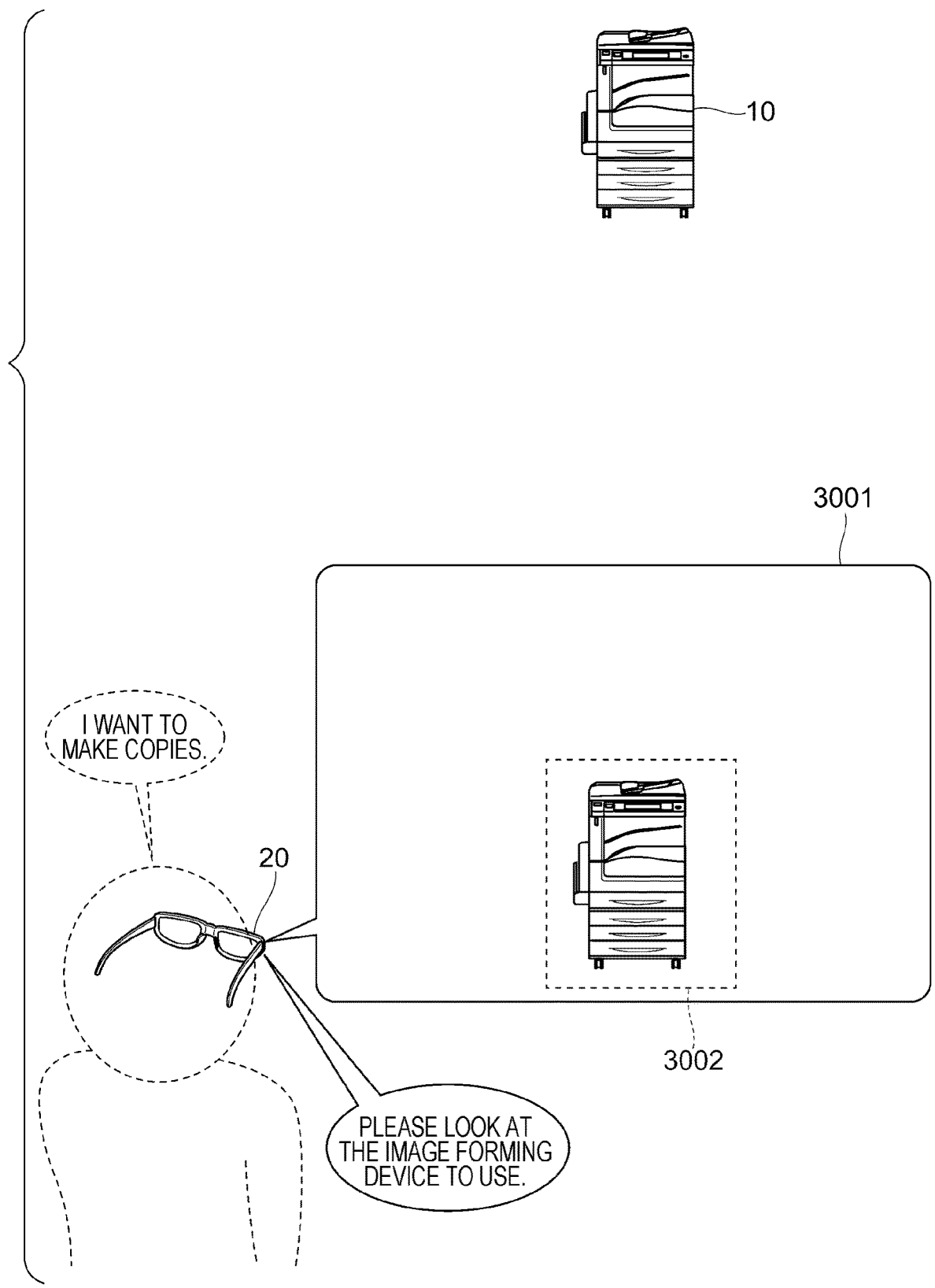
FIG. 26 is a diagram explaining one example of a system configuration anticipated by Exemplary Embodiment 2.

FIG. 26 is a diagram explaining one example of a system configuration anticipated by Exemplary Embodiment 2. The system anticipated by Exemplary Embodiment 2 includes an image forming device 10 that forms an image on a medium such as paper, and a terminal device 20 worn on the head of a user who operates the image forming device 10. Hereinafter, the terminal device 20 will be called the wearable terminal.

Note that the hardware configuration and the functional configuration of the wearable terminal used in the present exemplary embodiment are the same as the terminal device 20 described in Exemplary Embodiment 1.

In FIG. 26, an image being looked at by the user wearing the wearable terminal on one's head is illustrated in a balloon. In the case of the present exemplary embodiment, the user is checking the image forming device 10, which actually exists before the user's eyes, with the naked eye.

In this example, a process is started by having the user make an utterance saying "I want to make copies." The wearable terminal recognizes the utterance by the user, and outputs speech saying "Please look at the image forming device to use." to specify the image forming device 10 to be operated. The speech is output from a speaker. Note that the wearable terminal may also display a text string stating "Please look at the image forming device to use." inside the user's field of vision.

A balloon 3001 in the diagram is a representation of the space that the user is seeing. A frame border 3002 inside the balloon represents an object that is being targeted for recognition by the wearable terminal. The frame border 3002 is a virtual image that does not exist in the real space. In this way, technology that superimposes virtual visual information created by a computer onto a real object is called augmented reality (AR) or mixed reality (MR).

The wearable terminal analyzes the image in the range enclosed by the virtual frame border 3002, and specifies a broad classification of the type of the image forming device 10 to be operated. The image analysis may be executed internally in the wearable terminal, or an analysis service provided by a cloud server or the like not illustrated may be used.

<Examples of Operating Screens>
<Screen 1: Specifying Model>

Figure 27:
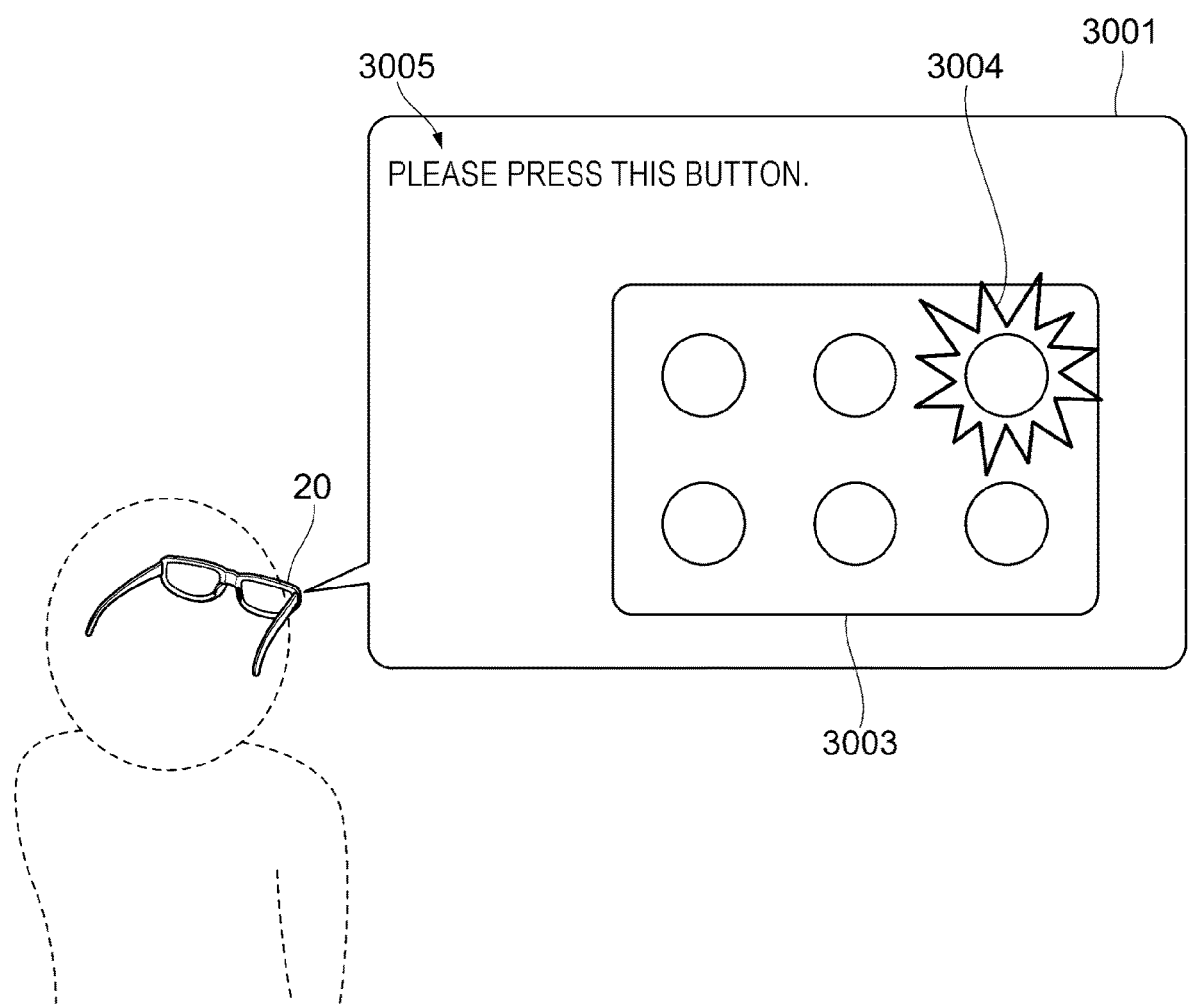
FIG. 27 is a diagram explaining an example of an operation used to specify the structure of a user interface screen.

FIG. 27 is a diagram explaining an example of an operation used to specify the structure of a user interface screen. In the balloon 3001 illustrated in FIG. 27, an operating panel 3003 of an image forming device 10 that the user is looking at is depicted. The wearable terminal displays a virtual image 3004 at the position of a button to be operated by the user, and also displays a virtual text string 3005 stating "Please press this button." The virtual text string is displayed as though floating in the space. Every time the user operates the specified button, the wearable terminal displays the virtual image 3004 at the position of the next button to be operated. By the transitions of operating screens associated with the series of button operations, the model of the image forming device 10 is identified specifically. The process likewise may be executed internally in the wearable terminal, or an analysis service provided by a cloud server or the like not illustrated may be used.

Figure 28:
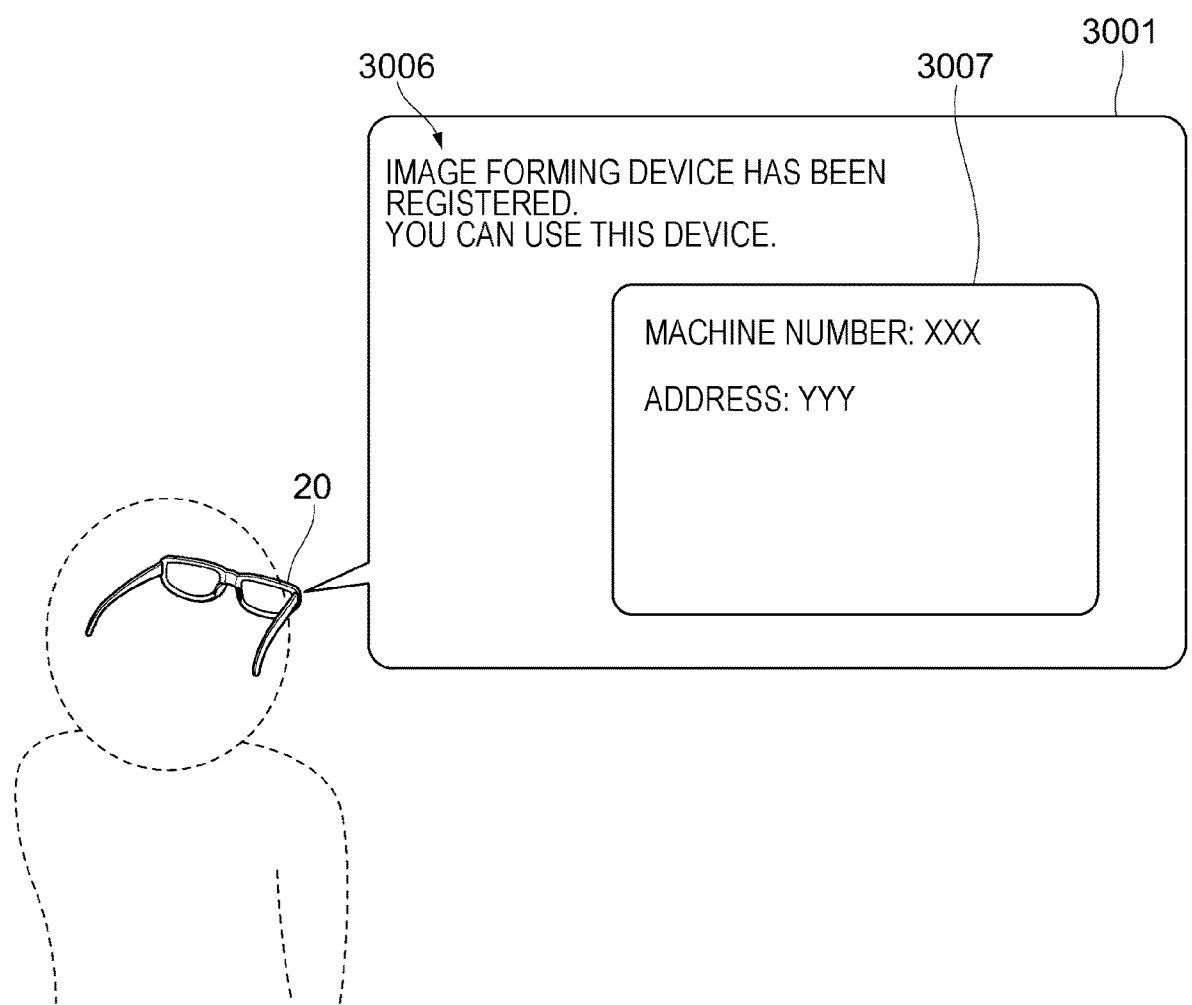
FIG. 28 is a diagram explaining an example of a screen notifying the user of the specified model.

FIG. 28 is a diagram explaining an example of a screen notifying the user of the specified model. In the case of FIG. 28, inside the balloon 3001, a text string 3006 stating "Image forming device has been registered. You can use this device." is displayed together with information 3007 that physically specifies the model. In the case of FIG. 28, a machine number is "XXX" and an address is "YYY".

<Screen 2: Case of a Single Job Memory Candidate>

Figure 29:
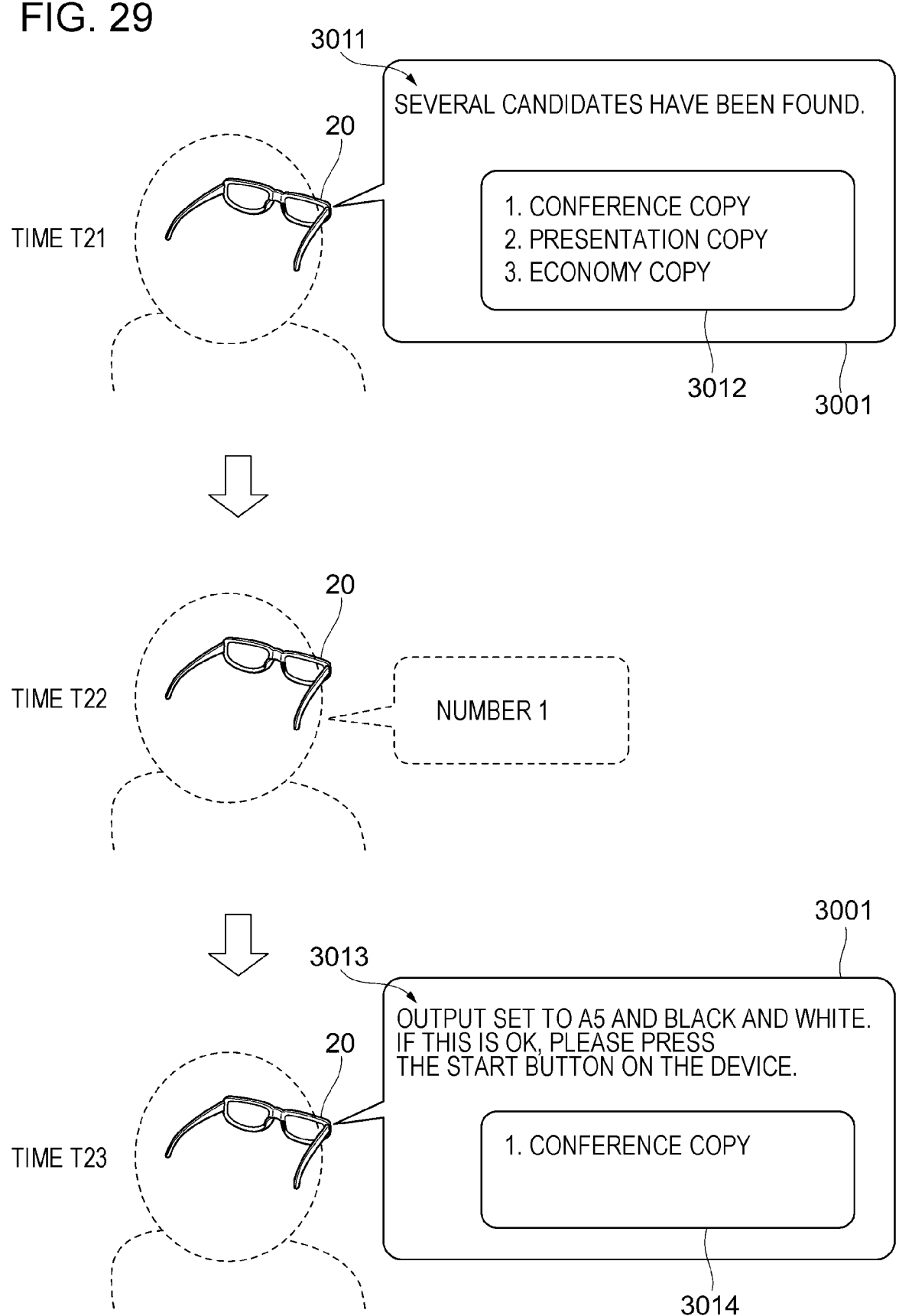
FIG. 29 is a diagram explaining an example of operating screen transitions in a case where the user uses a wearable terminal to read out a job memory.

FIG. 29 is a diagram explaining an example of operating screen transitions in a case where the user uses a wearable terminal to read out a job memory.

A time T21 corresponds to a point in time after the utterance by the user saying "I want to make copies." Similarly to the case in Exemplary Embodiment 1, the wearable terminal detecting the utterance saying "I want to make copies." reads out job memory information from the image forming device 10, and searches for job memory candidates close to what the user desires.

At time T21, three candidates have been found. Accordingly, a text string 3011 stating "Several candidates have been found." and job memory candidates 3012 are displayed in the balloon 3001. In the job memory candidates 3012, "1. Conference copy", "2. Presentation copy", and "3. Economy copy" are displayed.

At a time T22, the user says the number of a candidate to select. Specifically, the user makes an utterance saying "Number 1". The content of the utterance is detected by the wearable terminal.

The operating screen illustrated at time T23 is an example of a screen notifying the user that the selection of the job memory has been received. In the balloon 3001, a text string 3013 stating "Output set to A5 and black and white. If this is OK, please press the Start button on the device." and a button 3014 indicating the selected job memory are displayed.

Like the display screen at time T1 in FIG. 15, the text string 3013 expresses the differences from the default parameters. For this reason, it becomes easy to confirm whether the settings of the parameter values in the selected job memory are in agreement with one's own desires.

Figure 30:
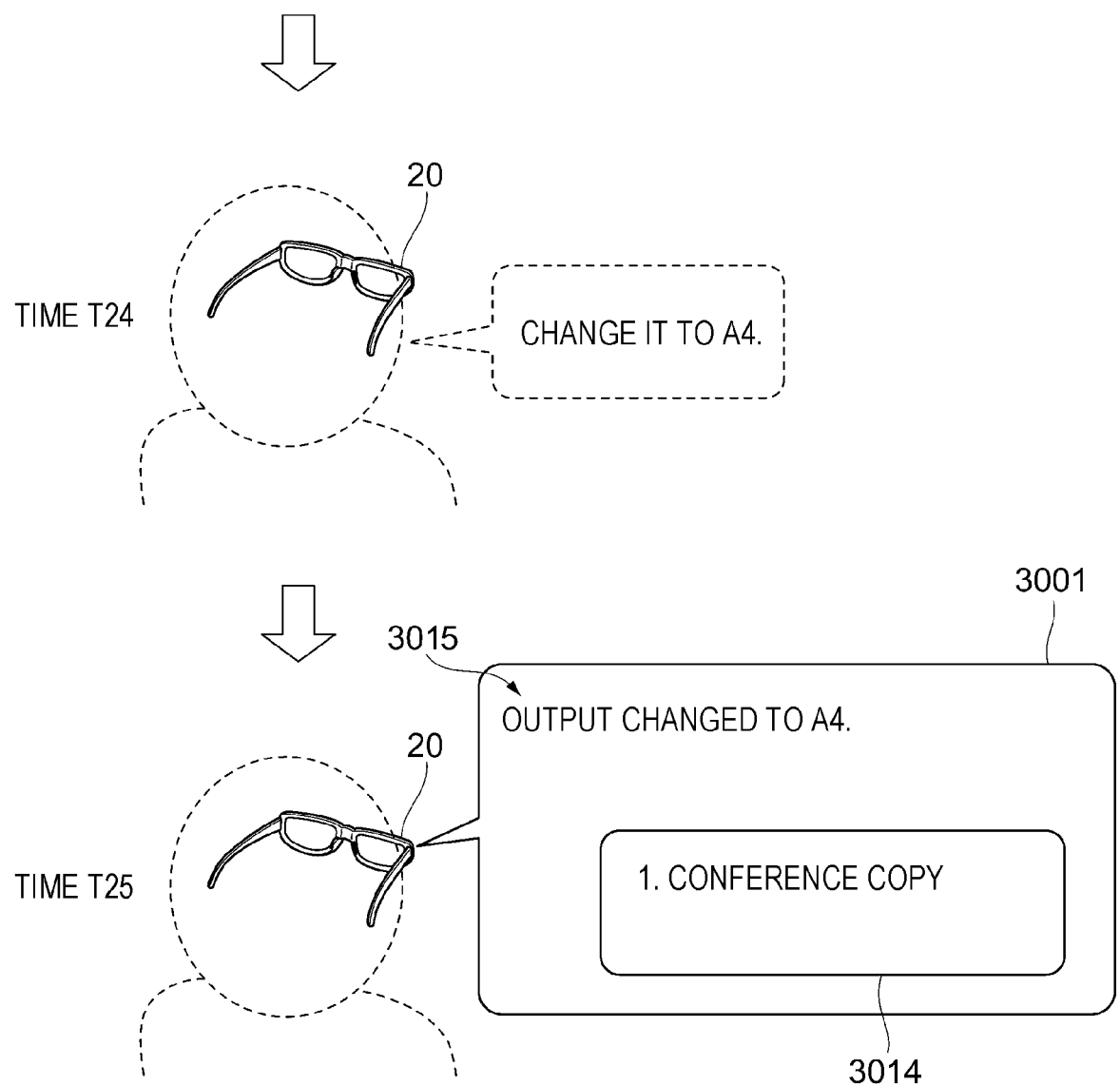
FIG. 30 is a diagram explaining an example of an operating screen in a case of giving an instruction to change a parameter value.

FIG. 30 is a diagram explaining an example of an operating screen in a case of giving an instruction to change a parameter value.

Herein, the paper size is different from what the user wants. For this reason, at a time T24, the user makes an utterance saying "Change it to A4." The content of the utterance is detected in the wearable terminal. Time T24 corresponds to time T2 in FIG. 15.

At a time T25, a response from the wearable terminal is displayed in the balloon 3001. In the balloon 3001 at this point, a text string 3015 stating "Output changed to A4." is displayed. Time T25 corresponds to time T3 in FIG. 15.

<Screen 3: Re-Executing a Job Memory>

Hereinafter, an example of an operating screen in the case of using the wearable terminal to give a re-execution instruction will be described.

Figure 31:
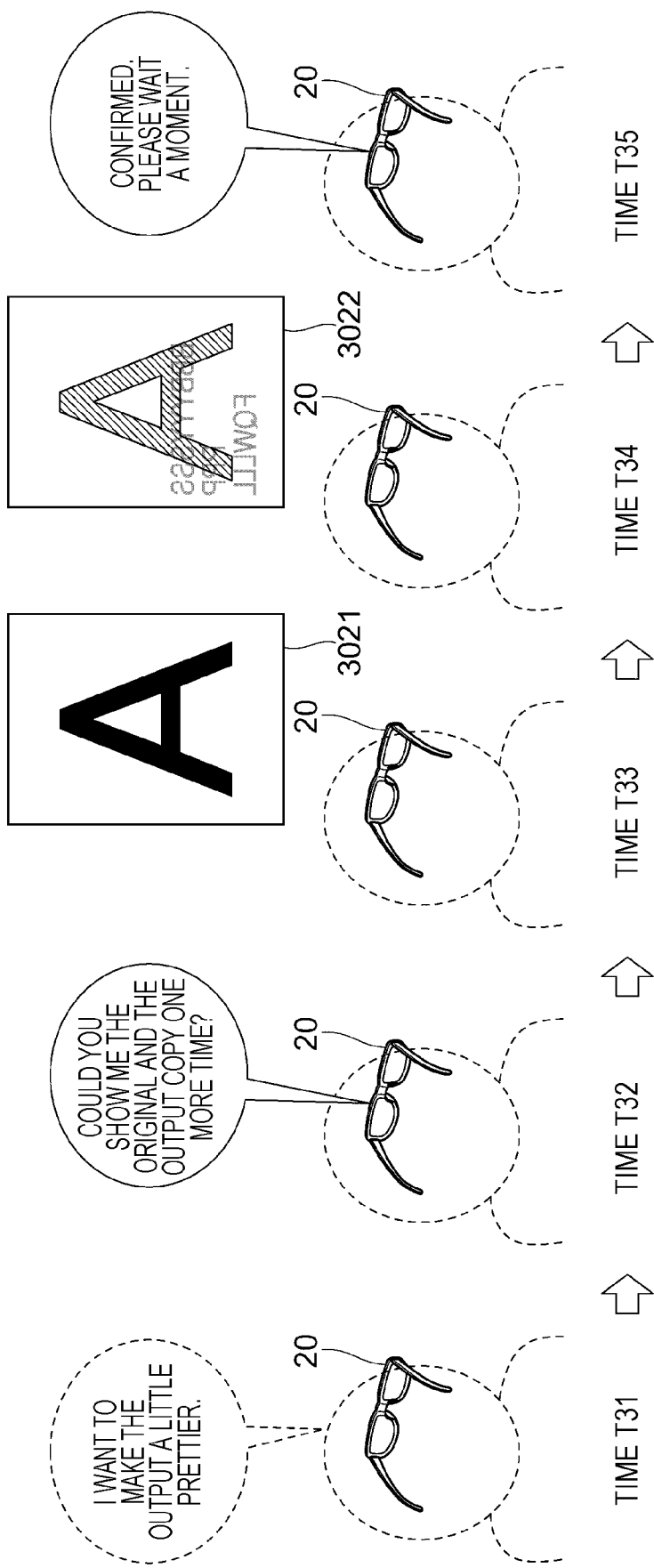
FIG. 31 is a diagram explaining a technique of analyzing the cause of an inexpedience through an image of an object viewed by the user.

FIG. 31 is a diagram explaining a technique of analyzing the cause of an inexpedience through an image of an object viewed by the user.

At a time T31, the user says "I want to make the output a little prettier.", and conveys to the wearable terminal a desire to re-execute a job memory. In the case in which the user is wearing the wearable terminal, it is possible to acquire an image of an object on the spot, without having to use the output image log.

Accordingly, at a time T32, the wearable terminal outputs the message "Could you show me the original and the output copy one more time?" from a speaker. Note that, like the other examples, it is also possible to prompt the user to perform an action by displaying a virtual text string in the space.

At a time T33, the user looks at a document 3021 while wearing the wearable terminal. An image of the document 3021 is captured by the camera 205 (see FIG. 4) installed in the wearable terminal.

At a time T34, the user looks at an output copy 3022 while wearing the wearable terminal. An image of the copy 3022 is also captured by the camera 205 installed in the wearable terminal. In the case of FIG. 31, the characters of the document 3021 are dense and clearly expressed, but the characters of the copy 3022 are faint and there is also visible bleed-through.

Note that the document 3021 and the copy 3022 may also be imaged at the same time insofar as the document 3021 and the copy 3022 are distinguishable. Also, the order of imaging may be switched such that the copy 3022 is imaged first and the document 3021 is imaged second.

When the imaging of both is confirmed, as illustrated at a time T35, a message such as "Confirmed. Please wait a moment." is output from the wearable terminal.

The analysis of the acquired images is the same as the case of analyzing the output image log.

<Screen 4: Assisting with Troubleshooting Work>

FIG. 32 is a diagram explaining a guidance technique in a case where a troubleshooting measure such as cleaning is relevant to addressing the cause of the inexpedience.

In the case of using a mobile terminal device 20 such as a smartphone (see FIG. 1), active involvement by the user is sought. For example, for troubleshooting, work that is different from the work of performing a troubleshooting measure may be demanded, such as accessing a published Uniform Resource Locator (URL), changing slides, or playing and pausing a video.

On the other hand, in the case of wearing a wearable terminal, the state of troubleshooting progress is imaged with the camera 205. For this reason, the user becomes able to concentrate on troubleshooting.

At a time T41, a troubleshooting measure to be performed by the user is indicated. First, the message "The toner needs replacement. Please watch this video to see how to do it." is output from the wearable terminal. At the same time, as illustrated in the balloon 3001, a video 3031 explaining the method of replacing the toner is displayed, and playback is started automatically. Note that the playback of the video 3031 presumes detecting that the user is looking at the image forming device 10 to be operated.

The camera 205 of the wearable terminal captures an image of the user doing the work. The wearable terminal uses the result of image analysis to control playback such that the content of the user's work and the content of the image being played back are in agreement. For example, at time T41, the playback of the video 3031 is paused at a point in time of instructing the user to open a door of the image forming device 10.

At a time T42, the door of the image forming device 10 is opened. Accordingly, the wearable terminal resumes playback of the video 3031, and guides the user during the work of removing the toner cartridge from the device body.

<Screen 5: Presenting Parameter Values for Improving Image Quality>

Figure 33:
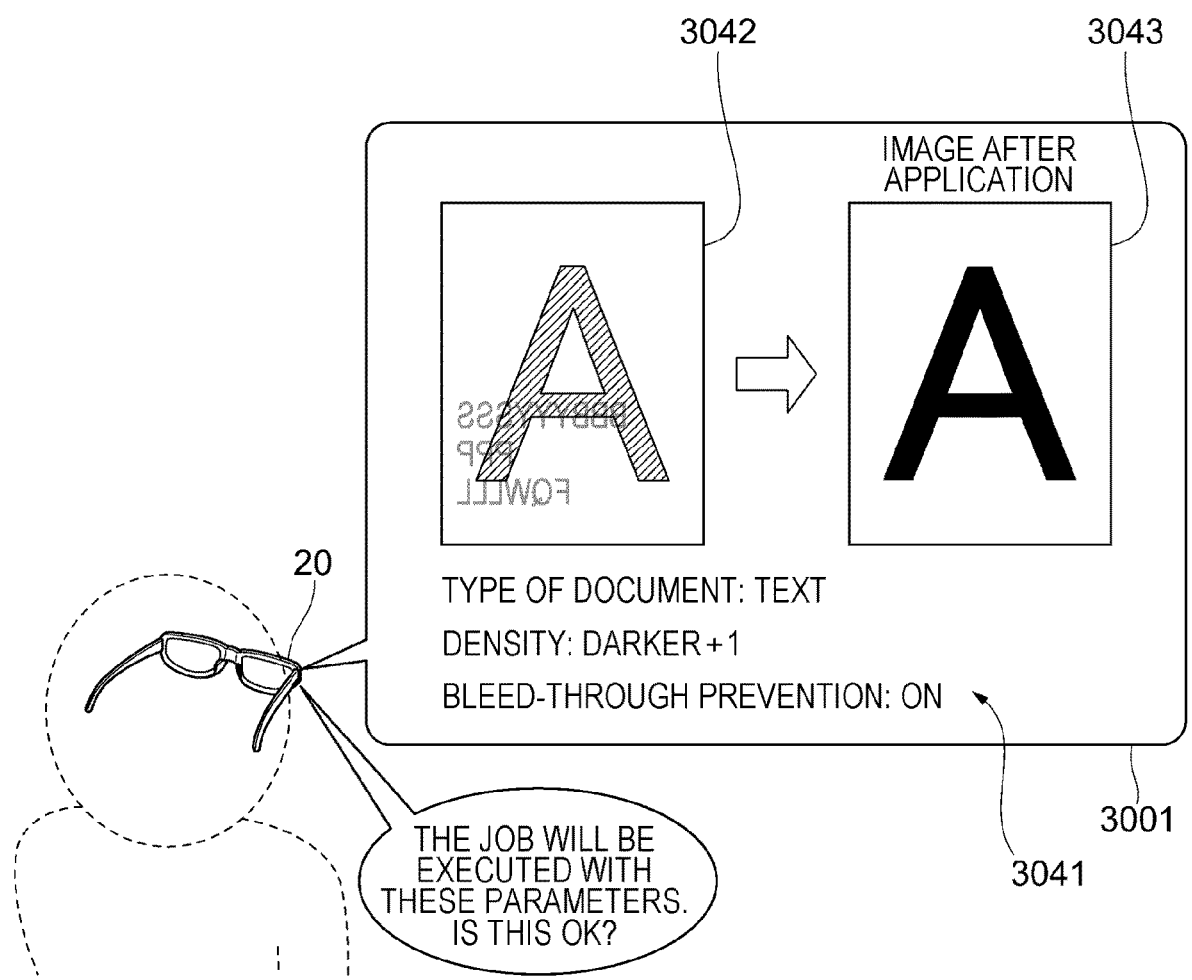
FIG. 33 is a diagram explaining the presentation of parameters recommended to improve image quality.

FIG. 33 is a diagram explaining the presentation of parameters recommended to improve image quality.

As illustrated in the balloon 3001, the user wearing the wearable terminal is presented with a list 3041 of recommended parameter values, together with an output copy 3042 and a representation 3043 of the output after applying the recommended parameter values.

In the case of FIG. 33, the characters of the copy 3042 are faint and there is also visible bleed-through. For this reason, in the list 3041 of recommended parameter values, "Text" is displayed as the type of document parameter value, "Darker+1" is displayed as the density parameter value, and "On" is displayed as the bleed-through prevention parameter value.

Note that in the example of FIG. 33, the message "The job will be executed with these parameters. Is this OK?" is output from the wearable terminal.

<Screen 6: Suggesting Position of Button or the Like to be Operated or Checked>

Figure 34:
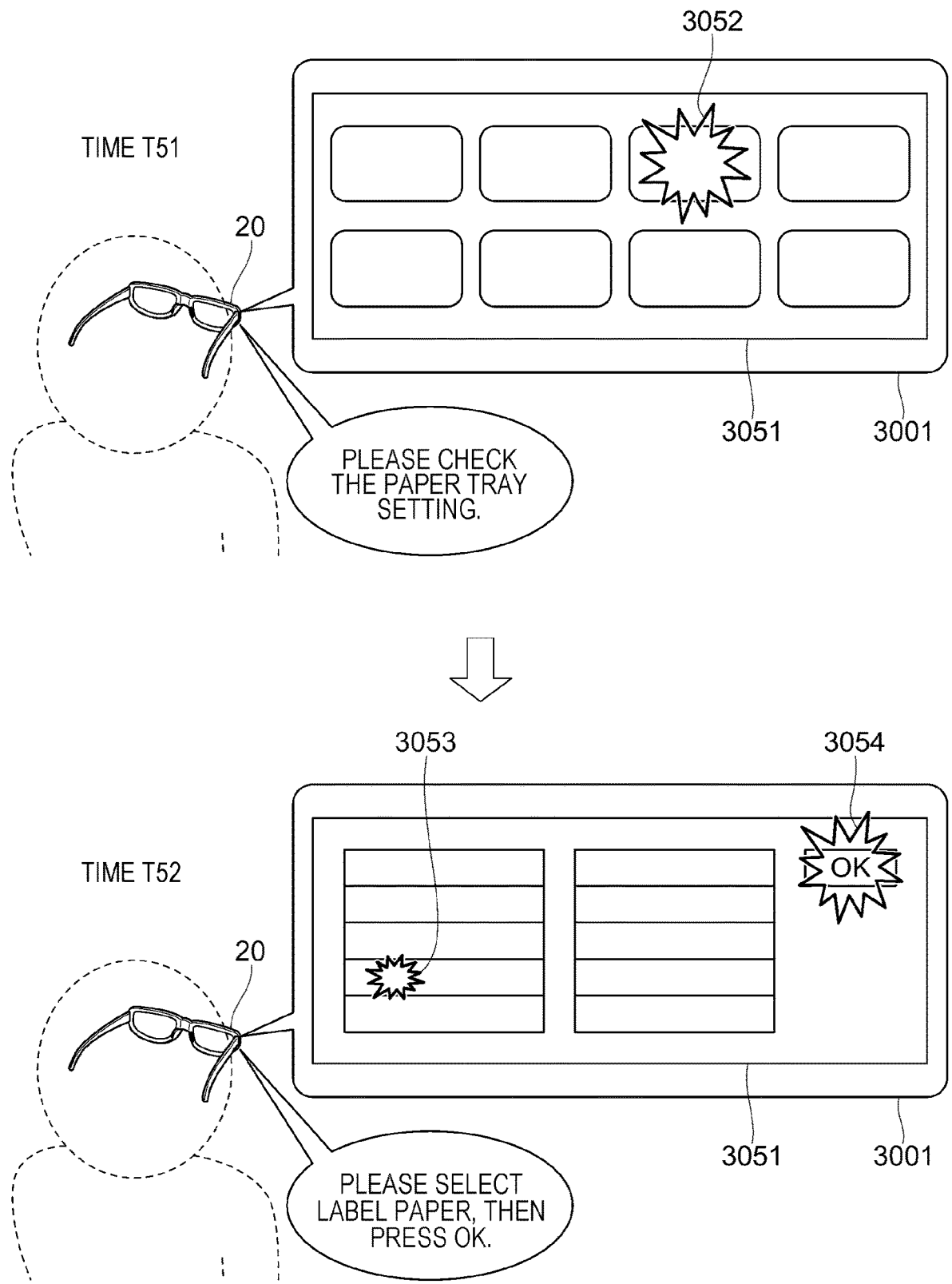
FIG. 34 is a diagram explaining an example of a technique of suggesting, to the user, the position of a button or the like to operate or check.

FIG. 34 is a diagram explaining an example of a technique of suggesting, to the user, the position of a button or the like to operate or check.

As described earlier, the wearable terminal acquires not only the model of the image forming device 10 (see FIG. 1) to be operated, but also information related to the structure of the user interface screens. For this reason, if there is an image of an operation panel 3051 that the user is actually looking at, it is also possible to specify the position of a button to be operated by the user.

At a time T51, a virtual icon 3052 is displayed superimposed over a specific button included on the real operation panel 3051. Note that the message "Please check the paper tray setting." is output from the wearable terminal. The icon 3052 is displayed using a combination of features such as shape, color, brightness, and blinking pattern to draw the user's attention.

By the display of the icon 3052, the user becomes able to immediately notice the position of the button to be checked. In this example, the user taps the button at the position where the icon 3052 is being displayed.

At a time T52, a screen for specifying the type of paper housed in a paper tray is displayed on the operation panel 3051. For this reason, buttons for each type of paper are arranged on the operation panel 3051.

In the example of FIG. 34, the message "Please select label paper, then press OK." is output from the wearable terminal. For this reason, on the operation panel 3051, a virtual icon 3053 is displayed on top of a button corresponding to label paper, and a virtual 3054 is displayed on top of an OK button. By the display of the icons 3053 and 3054, the user is able to immediately notice the positions of the buttons to be checked.

Other Exemplary Embodiments

The foregoing describes exemplary embodiments of the present disclosure, but the technical scope of the present disclosure is not limited to the scope described in the foregoing exemplary embodiments. It is clear from the claims that a variety of modifications or alterations to the foregoing exemplary embodiments are also included in the technical scope of the present disclosure.

In the foregoing exemplary embodiments, a smartphone is given as one example of the terminal device 20 in Exemplary Embodiment 1 and a wearable terminal is given as one example of the terminal device 20 in Exemplary Embodiment 2, but the application program executed by the terminal device 20 may also be executed on a server capable of communicating with the terminal device 20. In this case, the server becomes one example of an information processing device. The server may be a cloud server or an on-premises server.

Of course, the services provided via the execution of the application program described above may also be realized by cooperation between the terminal device 20 and a server not illustrated. In such a case, the cooperating terminal device 20 and server not illustrated become one example of an information processing device.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor, configured to:
receive a job memory specified by a user, wherein the job memory comprises a default parameter value for setting a function and one or more parameter values set by the user, and wherein the job memory is saved in an image forming device to be operated;
extract a parameter different from the default parameter from among the one or more parameter values in the job memory specified by the user; and
present the extracted parameter to the user, and prompt the user to confirm a desire to change the extracted parameter.

2. The information processing device according to claim 1, wherein the processor is further configured to:
receive an instruction to change a parameter by the user through speech input.

3. The information processing device according to claim 2, wherein
in a case in which a parameter name spoken by the user is different from a parameter name used by the image forming device, the reception unit processor converts the spoken parameter name to the parameter name used by the image forming device.

4. The information processing device according to claim 2, wherein
in a case in which content of a user utterance received after an output of an image is content demanding to output the image again, content of a change to a recommended parameter is presented through voice interaction with the user.

5. The information processing device according to claim 4, wherein
before finalizing the content of the change, a screen presenting a comparison of an image representation in a case of using the unchanged parameter and an image representation expected in a case of using the changed parameter is presented to the user.

6. The information processing device according to claim 1, wherein
the processor presents content of a recommended change to the user after presenting the extracted parameter.

7. The information processing device according to claim 6, wherein
the processor decides a candidate of the content of the change on a basis of a combination of read-out parameters and history of changes to the combination.

8. The information processing device according to claim 1, wherein
in a case in which content of a change received from the user corresponds to predetermined prohibited matter, an indication of not accepting the change is presented to the user.

9. The information processing device according to claim 1, wherein
in a case in which a parameter related to a destination is included in a combination of read-out parameters, the user is prompted to confirm a current destination.

10. The information processing device according to claim 1, wherein
the image forming device to be operated is specified on a basis of an image captured by a glasses-style terminal that the user wears on one's head.

11. The information processing device according to claim 1, wherein a job memory name is set for the job memory, and the job memory is specified by inputting the job memory name.

12. The information processing device according to claim 1, in a case where there are a plurality of job memory candidates corresponding to the job memory specified by user, the processor presents the job memory candidates to the user and receives a selected job memory candidate selected by the user from among the plurality of job memory candidates.

13. A mobile terminal comprising:
- a processor, configured to:
  - receive a job memory specified by a user, wherein the job memory comprises a default parameter value for setting a function and one or more parameter values set by the user, and wherein the job memory is saved in an image forming device to be operated;
  - a parameter different from the default parameter from among the one or more parameter values in the job memory specified by the user; and
  - present the extracted parameter to the user, and prompt the user to confirm a desire to change the extracted parameter.

14. A non-transitory computer readable medium storing a program causing a computer to execute a process for processing information, the process comprising:
- receiving a job memory specified by a user, wherein the job memory comprises a default parameter value for setting a function and one or more parameter values set by the user, and wherein the job memory is saved in an image forming device to be operated;
- extracting a parameter different from the default parameter from among the one or more parameter values in the job memory specified by the user; and
- presenting the extracted parameter to the user, and prompting the user to confirm a desire to change the extracted parameter.

15. An information processing device comprising:
- means for receiving a job memory specified by a user, wherein the job memory comprises a default parameter value for setting a function and one or more parameter values set by the user, and wherein the job memory is saved in an image forming device to be operated;
- means for extracting a parameter different from the default parameter from among the one or more parameter values in the job memory specified by the user; and
- means for presenting the extracted parameter to the user, and prompting the user to confirm a desire to change the extracted parameter.

* * * * *